United States Patent [19]

Katayama et al.

[11] Patent Number: 5,086,484
[45] Date of Patent: Feb. 4, 1992

[54] IMAGE PROCESSING APPARATUS WITH FIXED OR VARIABLE THRESHOLD

[75] Inventors: Akihiro Katayama, Kawasaki; Hidefumi Oosawa, Kawaguchi, both of Japan

[73] Assignee: Canon Kabushiki Kaisha, Tokyo, Japan

[21] Appl. No.: 396,339

[22] Filed: Aug. 21, 1989

[30] Foreign Application Priority Data

| Aug. 24, 1988 | [JP] | Japan | 63-208274 |
| Aug. 29, 1988 | [JP] | Japan | 63-212386 |
| Aug. 29, 1988 | [JP] | Japan | 63-212387 |
| Nov. 8, 1988 | [JP] | Japan | 63-280484 |

[51] Int. Cl.$^5$ ............................................. G06K 9/38
[52] U.S. Cl. ........................................ 382/50; 382/22; 382/52; 358/465
[58] Field of Search .................. 382/50, 52, 22, 56, 382/27; 358/465, 457, 461, 466, 455

[56] References Cited

U.S. PATENT DOCUMENTS

| 4,386,366 | 5/1983 | Mori | 358/465 |
| 4,654,721 | 3/1987 | Goertzel et al. | 358/459 |
| 4,821,334 | 4/1989 | Ogino et al. | 382/50 |
| 4,878,125 | 10/1989 | Katayama et al. | 382/50 |
| 4,958,238 | 9/1990 | Katayama et al. | 382/22 |
| 4,969,052 | 11/1990 | Ishida et al. | 382/50 |

Primary Examiner—David K. Moore
Assistant Examiner—Yon Jung
Attorney, Agent, or Firm—Fitzpatrick, Cella, Harper & Scinto

[57] ABSTRACT

An image processing apparatus of this invention is arranged so that a threshold for use in binarization is switched between two types in accordance with whether or not a portion in which input pixel data is located is positioned in the vicinity of an edge portion of an image. One type is a threshold which varies in the width of variation corresponding to the density of the input pixel, while the other type is a fixed threshold. If an objective pixel is located in the vicinity of an edge portion of an image, binarization is carried out with the fixed threshold, while if the objective pixel is located in a non-edge portion, the variable threshold is used.

25 Claims, 24 Drawing Sheets

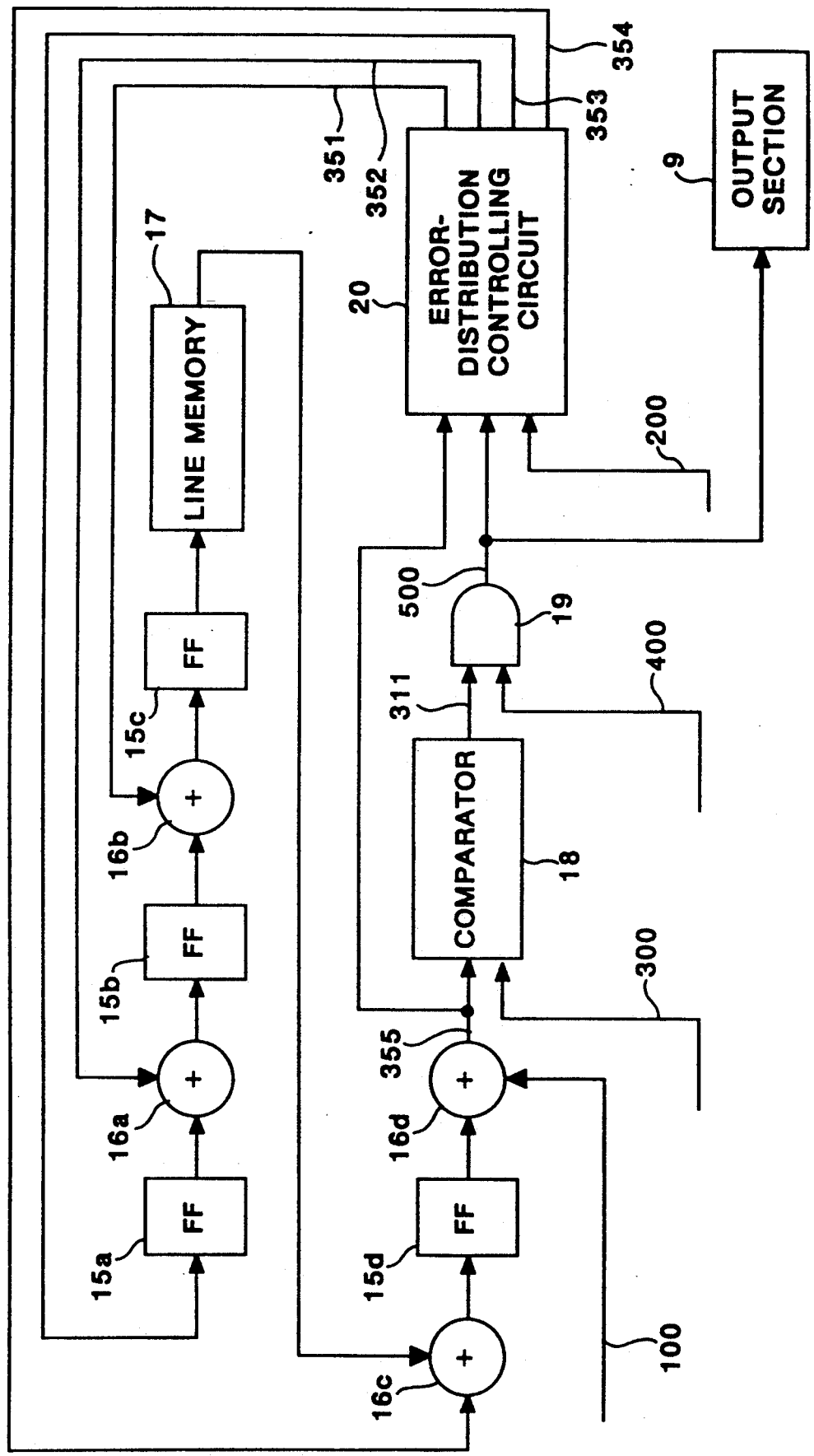
F I G. 5

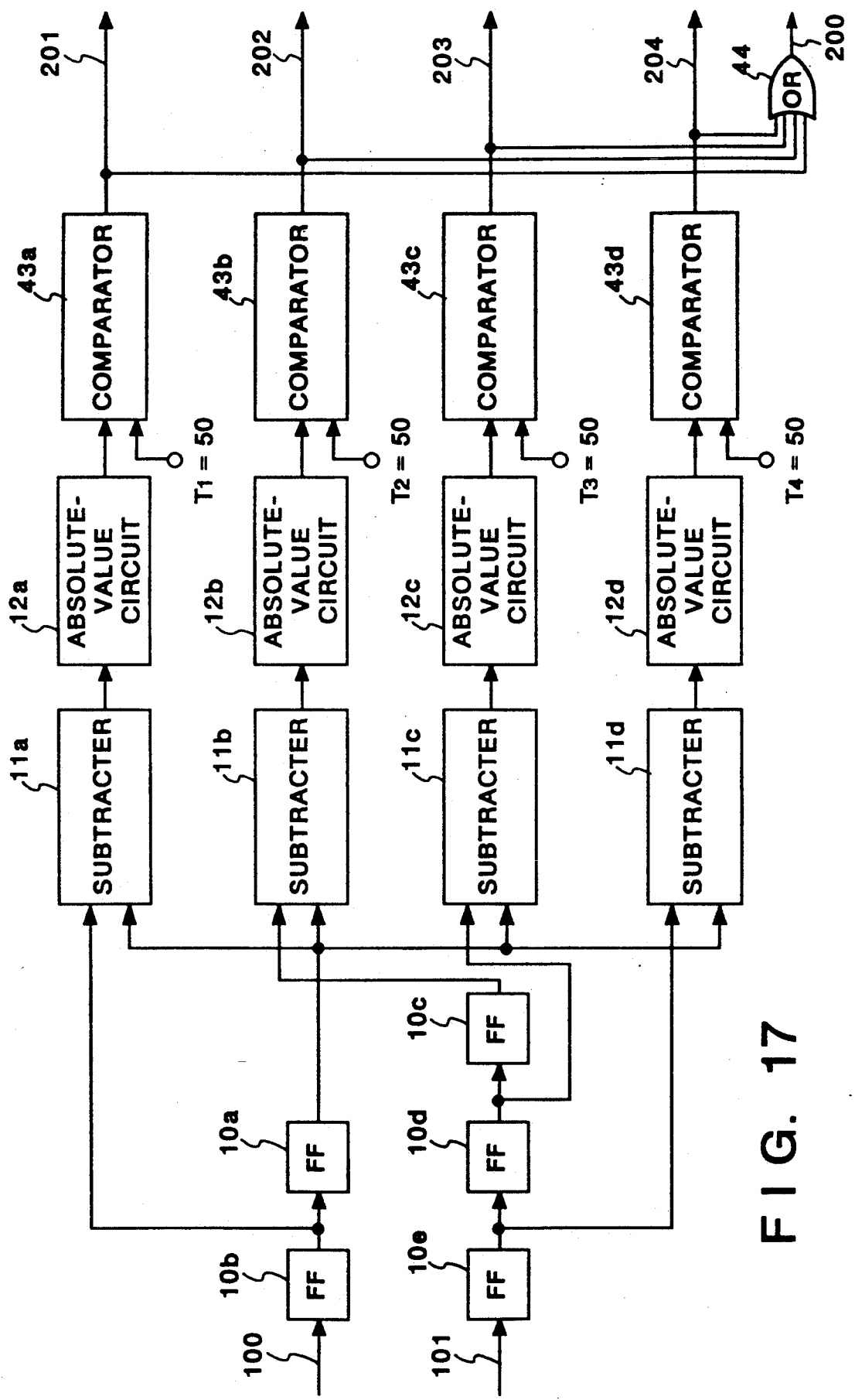
F I G. 17

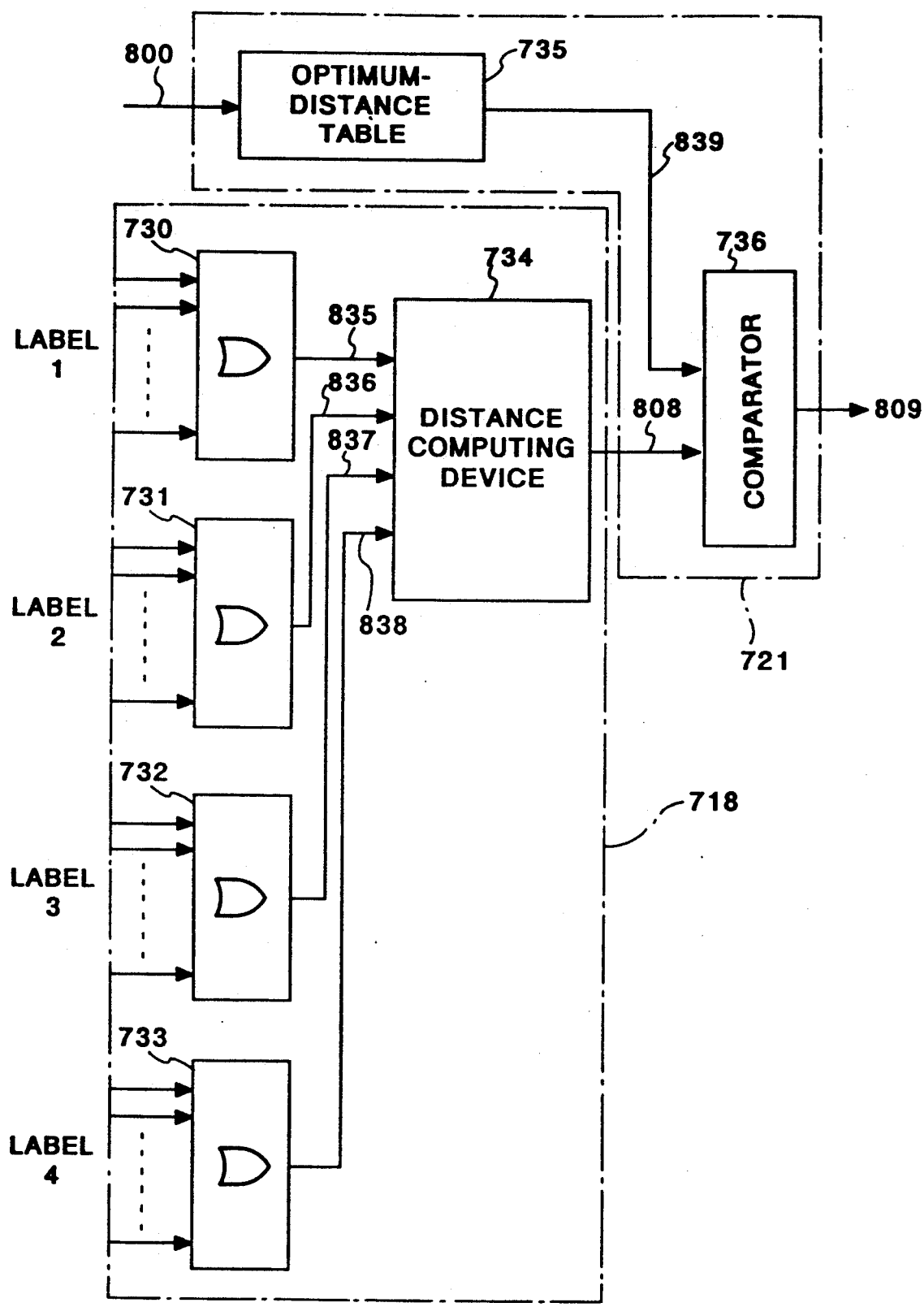
F I G. 20

IMAGE PROCESSING APPARATUS WITH FIXED OR VARIABLE THRESHOLD

BACKGROUND OF THE INVENTION

1. Field of the Invention

The present invention relates generally to an image processing apparatus and, more particularly, to an image processing apparatus for generating output pixel data by halftoning input pixel data.

2. Description of the Related Art

A dither method is known as one conventional means utilized for reproducing half tone in the image forming sections of digital printers, digital facsimiles or the like of known types.

In a normal dither method, a dither matrix of m×n is prepared, and a binarized block of m×n is formed by comparing a group of input pixel data with corresponding thresholds in the matrix. In this manner, a half-tone image is reproduced in a pseudoform.

However, the number of steps of tone representation is restricted by the matrix size of the dither matrix. For example, in the case of tone representation in sixteen steps (a 4×4 dither matrix or the like), there is a problem in that a pseudo-outline may occur in an output image and a good output image cannot be obtained.

In such a situation, a method which has recently received special attention is an error diffusion method.

This method was proposed by Floyd and Steinberg in the paper entitled "An Adaptive Algorithm for Spatial Gray Scale," SID DIGEST 1975. The error diffusion method is superior to the dither method in resolution and tone representation.

In the error diffusion method, since an error which occurs when a binary output pixel is determined is sequentially spatially calculated in a cumulative manner, it is possible to make the density of an input image correspond to the density of an output image. Unlike the dither process, the number of steps of tone representation is not limited by the size of the dither matrix, and it is therefore possible to improve tone reproduction and resolution, which cannot both always be compatibly satisfied using the dither process.

However, such an error diffusion method has a problem of causing the phenomenon in which, if a low-density portion is present at the portion of an image which corresponds to the beginning of the process, no dot is plotted and a white void is therefore formed in the low-density portion. This phenomenon likewise occurs in a low-density portion near an edge portion.

For example, as shown in FIG. 29, if the density of an area a of an original document is continuously low, white pixels will be continuously represented in a binarized output. All the errors that occur as the result of binarization become plus, and the errors are distributed to and accumulated in unprocessed neighboring pixels. As a result, for example in an area b, the accumulated errors exceed the thresholds of respective objective pixels, and black dots such as those shown in FIG. 29 are formed close to one another, thereby causing a deterioration in image quality.

To cope with the above problem, a method of varying a threshold on the basis of which an error is diffused is considered. In this method, however, dots which are present in an edge portion of an image, particularly in the peripheral portion of a character, a line drawing or the like are notched and the image quality of a character or a line drawing is thus degraded to a remarkable extent. In addition, in a uniform low-density portion, no dot is plotted and a roughly granular texture which may offend the eye may appear.

In addition to the methods described above, the assignee of the present invention has previously disclosed the following methods having similar purports.

In U.S. patent application Ser. No. 07/270,809 filed on Nov. 14, 1988, a variable-threshold process and a window process are disclosed. In the variable-threshold process, a threshold for use in binarization is varied in accordance with the density of an object pixel, or objective pixel (throughout the specification and claims, these two terms are used interchangeably) and an error diffusion method is carried out on the basis of the varied threshold. In the window process, a binarized area which has been processed is referred to and, if any dot is present in the area, no dot is plotted.

In U.S. Pat. No. 4,958,238, an edge detecting process is disclosed in which an error diffusion method is carried out in such a manner that no negative error is diffused into an area occupied by pixels which is located in the edge portion of an image.

In U.S. Pat. No. 4,969,252, a remainder correcting process is disclosed in which a remainder occurring when an error is diffused into an area occupied by pixels which neighbors on an objective pixel.

SUMMARY OF THE INVENTION

It is, therefore, a first object of the present invention to provide an image processing apparatus which can overcome the above-described problems.

It is a second object of the present invention to provide an image processing apparatus with which, in a low-density portion, a white void does not occur and black dots are not formed unduly close to one another and which makes it possible to prevent a notch from occurring in an edge portion of a character, a line drawing or the like.

To achieve the above object, in accordance with the present invention, there is provided an image processing apparatus which comprises inputting means for inputting pixel data, variable-threshold generating means for generating a threshold corresponding to the input pixel data, fixed-threshold generating means for generating a fixed threshold, decision means for making a decision as to whether or not an input objective pixel is located in the vicinity of an edge portion of an image, selecting means for selecting the variable-threshold generating means or the fixed-threshold generating means on the basis of the result of the decision made by the decision means, and quantizing means for quantizing the objective pixel on the basis of a threshold selected by the selecting means.

It is a third object of the present invention to provide an image processing apparatus which makes it possible to prevent a white void from occurring and black dots from being unduly close to one another, even in a low-density portion.

To achieve the above object, in accordance with the present invention, there is provided an image processing apparatus which comprises inputting means for inputting pixel data, area-state determining means for making a decision as to the state of quantized output pixel data in an area near to an objective pixel input from said input means, edge determining means for making a decision as to whether or not the objective pixel input by the inputting means is located in the vicinity of an edge portion of an image, variable-threshold generating means for generating a threshold corresponding to the input pixel data, quantizing means for quantizing the input pixel data into output pixel data on the basis of the threshold generated by the variable-threshold generating means and the result of the decision made by the area-state determining means, and distributing means for distributing an error amount which occurs when the quantizing means effects quantization to at least one non-quantized pixel which is positioned in the vicinity of the objective pixel.

It is a fourth object of the present invention to provide an image processing apparatus which is capable of inhibiting dots from being close to one another even in a low-density portion, thereby enabling production of a high-quality reproduced image.

To achieve the above object, in accordance with the present invention, there is provided an image processing method in which an error occurring when the input pixel data is quantized is distributed to a non-quantized neighboring pixel. This method comprises the steps of calculating a distance by which black pixels are allowed to be close to each other in accordance with the density of an objective pixel, determining whether or not a quantized black pixel is contained within the set distance of another, and outputting the objective pixel as a white pixel if the quantized black pixel is contained within such distance.

In accordance with another aspect of the present invention, an image processing method in which an error occurring when the input pixel data is quantized is distributed to a non-quantized neighboring pixel, comprises the steps of calculating the size of an area in which black pixels are allowed to be close to each other in accordance with the density of an objective pixel, determining whether or not a quantized black pixel is contained in the area, and outputting the objective pixel as a white pixel if the quantized black pixel is contained in the area.

To achieve the above object, in accordance with the present invention, there is provided an image processing apparatus in which an error occurring when input pixel data is quantized is distributed to a non-quantized neighboring pixel. This apparatus comprises arithmetic means for calculating a distance by which black pixels are allowed to be close to each other in accordance with the density of an objective pixel, detecting means for detecting the distance between the position of the objective pixel and the position of a pixel located at the shortest distance from the objective pixel in a group of quantized black pixels, decision means for determining whether or not the distance detected by the detecting means is contained within the distance calculated by the arithmetic means, and quantization correcting means for correcting the objective pixel as a white pixel and outputting the white pixel if the decision means determines that the distance detected by the detecting means is contained within the distance calculated by the arithmetic means.

It is a fifth object of the present invention to provide an image processing apparatus which enables quantization of image data while completely preserving the overall density of the image data before the quantization.

To achieve the above object, in accordance with the present invention, there is provided an image processing apparatus in which an error occurring when input pixel data is quantized is distributed to a non-quantized neighboring pixel. This apparatus comprises first calculating means for calculating, from an error occurring during quantization, values to be distributed to respective non-quantized neighboring pixels which are located in the vicinity of an objective pixel, first distributing means for distributing the values calculated by the first calculating means to the positions of corresponding individual neighboring pixels, second calculating means for calculating a lost error amount from the total sum of the values calculated by the first calculating means, and second distributing means for distributing the error amount calculated by the first calculating means to the position of one neighboring pixel which is located in a relatively different position with respect to the objective pixel position, at least each time the position of the objective pixel is updated.

Further objects, features and advantages of the present invention will become apparent from the following description based on the accompanying drawings and the claims appended hereto.

BRIEF DESCRIPTION OF THE DRAWINGS

FIG. 5 is a block diagram of a binarizing circuit in the embodiment;

FIG. 17 is a block diagram showing an edge detecting circuit in the fourth embodiment;

FIG. 20 is a block diagram showing the details of a distance calculator and a decision device in the fifth embodiment;

DESCRIPTION OF THE PREFERRED EMBODIMENTS

Embodiments of the present invention will be described below with reference to the accompanying drawings. In the following explanation of each of the embodiments, a copying machine is referred to for the purpose of illustration only.

Explanation of First Embodiment

Figure 1:
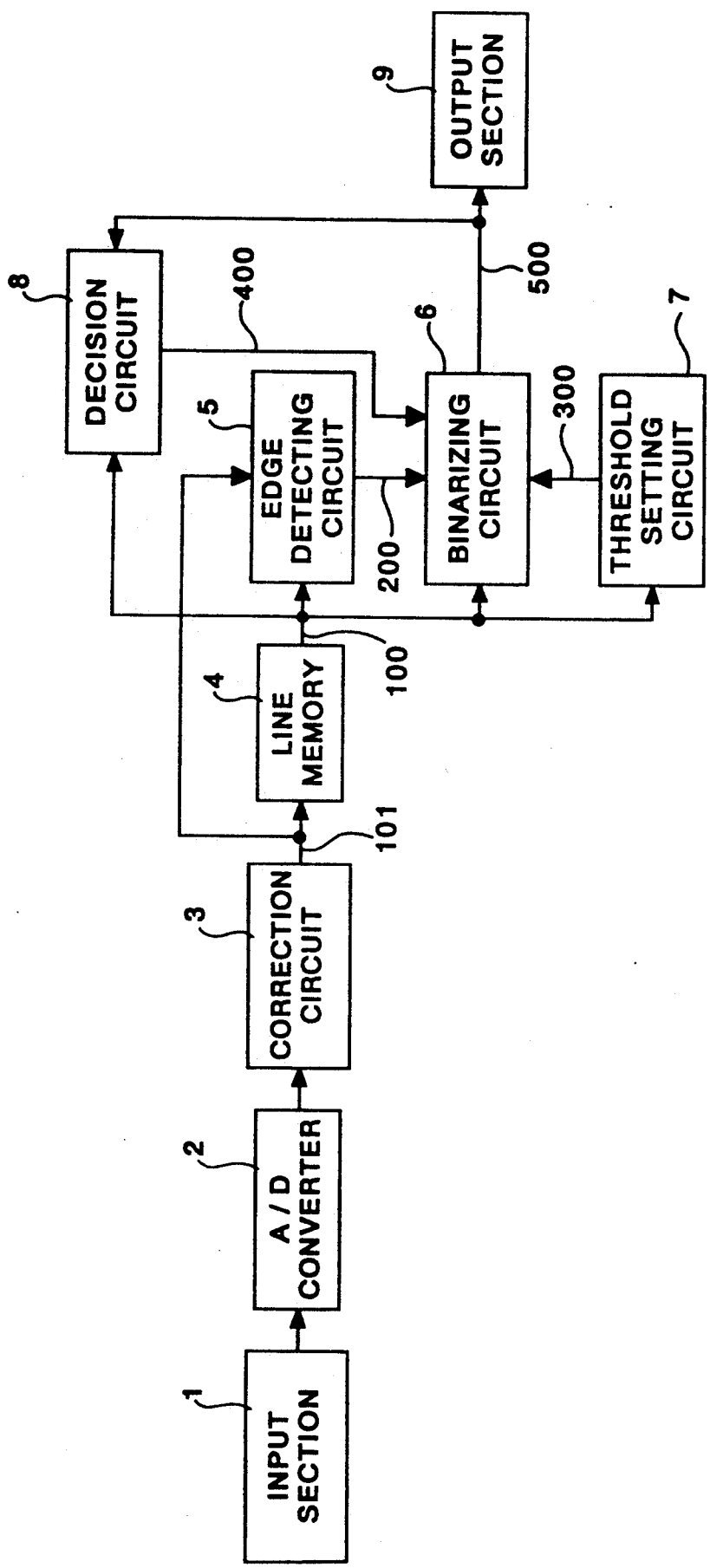
FIG. 1 is a block diagram showing the overall construction of a copying machine to which a first embodiment is applied.

FIG. 1 is a block diagram of a copying machine to which the first embodiment is applied.

Primary constituent elements are individually explained below in the order of processing.

First of all, an image is read from an original document by means of an input section 1 which consists essentially of a photoelectric conversion element (not shown) such as a CCD and a driver unit (not shown) for scanning it. A voltage-level signal which corresponds to the density of the readout image is output from the input section 1 to an A/D converter 2, where the voltage-level signal is converted into 8-bit digital data (corresponding to tone representation in 256 steps) for the purpose of quantization. After this conversion, the digital data is input to a correction circuit 3, where correction of shading is performed in order to correct the shade of the read-out image which would be affected by various factors such as the unevenness of sensitivity of the sensor of the input section 1, the unevenness of illumination of an illuminating section (not shown) and so on.

The corrected data (8-bit digital data) is input to a line memory (FIFO memory) 4 and an edge detecting circuit 5 through a data line 101. The line memory 4 is a delay-line memory which serves to time the edge detecting circuit 5, a binarizing circuit 6 and a threshold setting circuit 7.

The edge detecting circuit 5 detects whether or not an objective pixel is located in an edge position on the basis of the relationship in density between the objective pixel and neighboring pixels, and outputs to a signal line 200 a signal corresponding to the result of this decision. The threshold setting circuit 7 sets a threshold corresponding to the corrected data output to a data line 100, and outputs the set threshold to a data line 300.

The binarizing circuit 6 binarizes the data on the objective pixel (data supplied from the line memory 4) on the basis of the edge detection signal on the signal line 200 and a signal on a signal line 400 which will be described later, and outputs the result to a signal line 500. The output section 9 (such as a laser printer, an ink jet printer or the like) forms a visual image on the basis of the signal of "1" or "0" output to this signal line 500, and the signal on the signal line 500 is also supplied to a decision circuit 8.

On the basis of the signal (signal line 500) output from the binarizing circuit 6 and the corrected data output from the line memory 4, the decision circuit 8 makes a decision as to whether or not a dot which is on ("1") is present in a binarized area which neighbors on the objective pixel. The decision circuit 8 outputs the result of this decision to the signal line 400 to feed it back to the binarizing circuit 6.

The following is an explanation of the details of the portions from the edge detecting circuit 5 to the decision circuit 8 in the copying machine to which is applied the first embodiment provided with the above-described arrangement and construction. Incidentally, the correcting circuit 3 can be readily implemented with a ROM including a look-up table, and the description thereof is therefore omitted.

Figure 2:
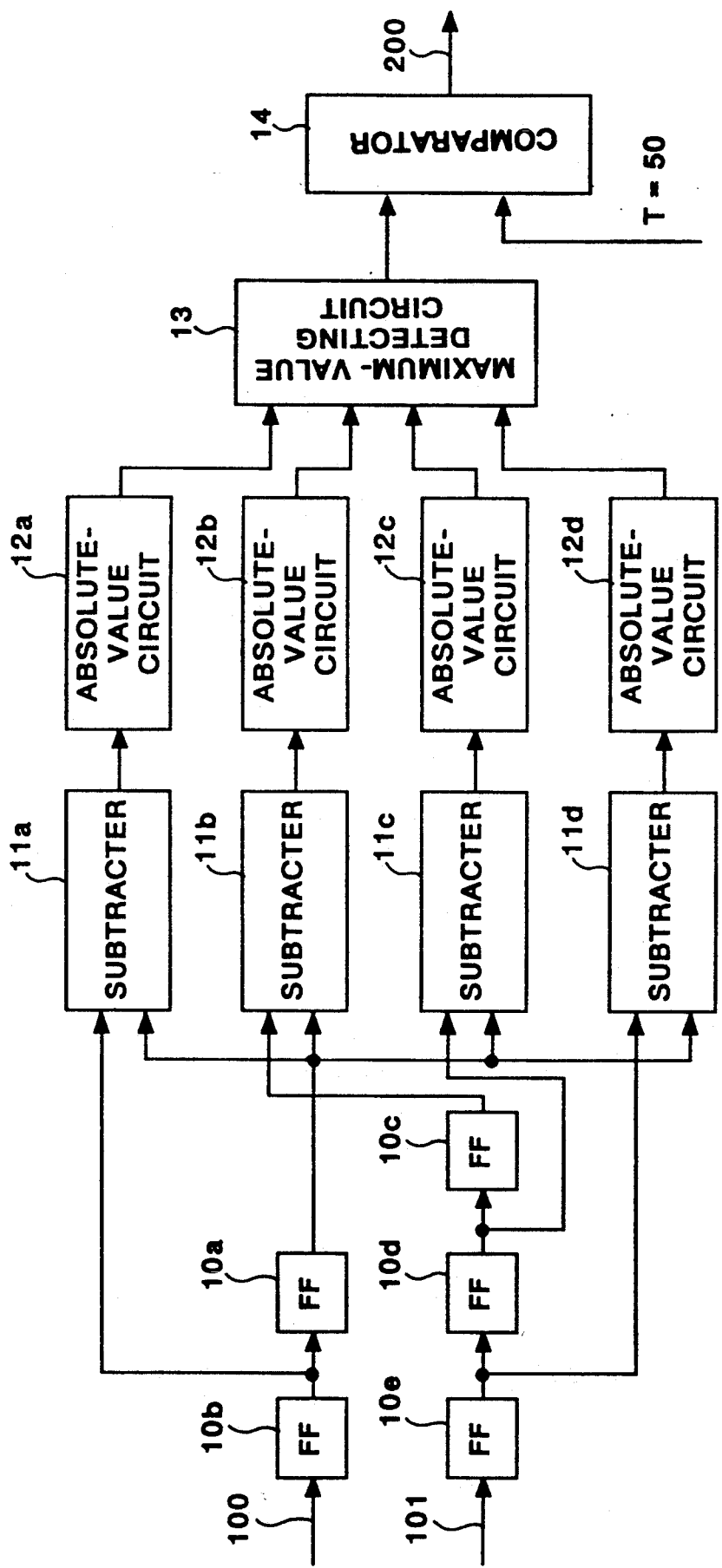
FIG. 2 is a block diagram showing an edge detecting circuit in the embodiment.
Figure 3:
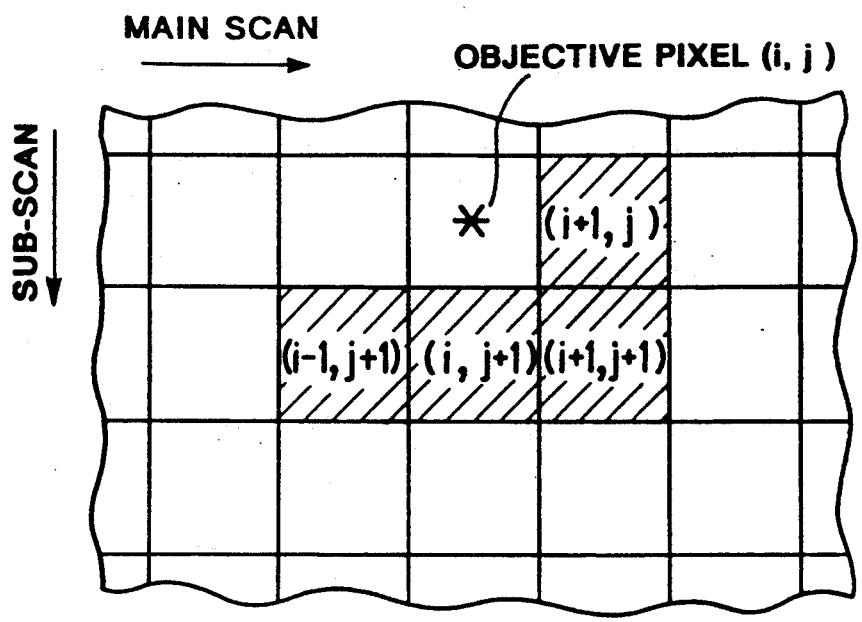
FIGS. 3 and 4 are views showing the positional relationships between an objective pixel and pixels for use in detecting an edge.

FIG. 2 shows a specific example of the construction of the edge detecting circuit 5 in the embodiment, and FIG. 3 is a schematic view which serves to illustrate the operation of the edge detecting circuit 5.

The edge portion of an image can be defined as a portion the concentration of which abruptly changes from low to high or vice versa. In other words, in order to detect whether or not an objective pixel is present in the vicinity of an edge portion, it is effective to detect whether or not the difference in density between the objective pixel and neighboring pixels is large.

For this reason, in this embodiment, as shown in FIG. 3, if the density at the position of the objective pixel (marked by "*" in the figure) is expressed with pixel (i, j), the following calculations are performed:

$$|\text{pixel}(i, j) - \text{pixel}(i+1, j)| \ldots \quad (1)$$

$$|\text{pixel}(i, j) - \text{pixel}(i-1, j+1)| \ldots \quad (2)$$

$$|\text{pixel}(i, j) - \text{pixel}(i, j+1)| \ldots \quad (3)$$

$$|\text{pixel}(i, j) - \text{pixel}(i+1, j+1)| \ldots \quad (4)$$

where $|\ldots|$ indicates an absolute value. If the maximum value of the values obtained by the calculations (1) to (4) is larger than a preset threshold T, then it is determined that the objective pixel is located in an edge portion.

Referring to FIG. 2, data (i, j), data (i+1, j), data (i−1, j+1), data (i, j+1) and data (i+1, j+1) are latched by flip-flops 10a to 10e, respectively, these data corresponding to the densities at the positions of the respective pixels mentioned above. Subtracters 11a to 11d perform subtractions represented by the aforesaid expressions (1) to (4), respectively, and absolute-value circuits 12a to 12d calculate the absolute values of the outputs from the corresponding subtracters 11a to 11d. A maximum-value detecting circuit 13 which follows the absolute-value circuits 12a to 12d detects the maximum value from among the above absolute values. Then, a comparator 14 compares the maximum value with the threshold T ("50" in this embodiment). If the value output from the maximum-value detecting circuit 13 is larger than the threshold T, the comparator 14 determines that the objective pixel is located in an edge portion, and provides an output signal of "1" to the signal line 200. If the output value is not larger than the threshold T (it is determined that the objective pixel is located in a non-edge portion), the comparator 14 outputs "0".

By performing processing based on above-described procedure, whether or not the objective pixel is located in an edge portion is determined from the relationship in density between the objective pixel and the neighboring pixels.

Figure 4:
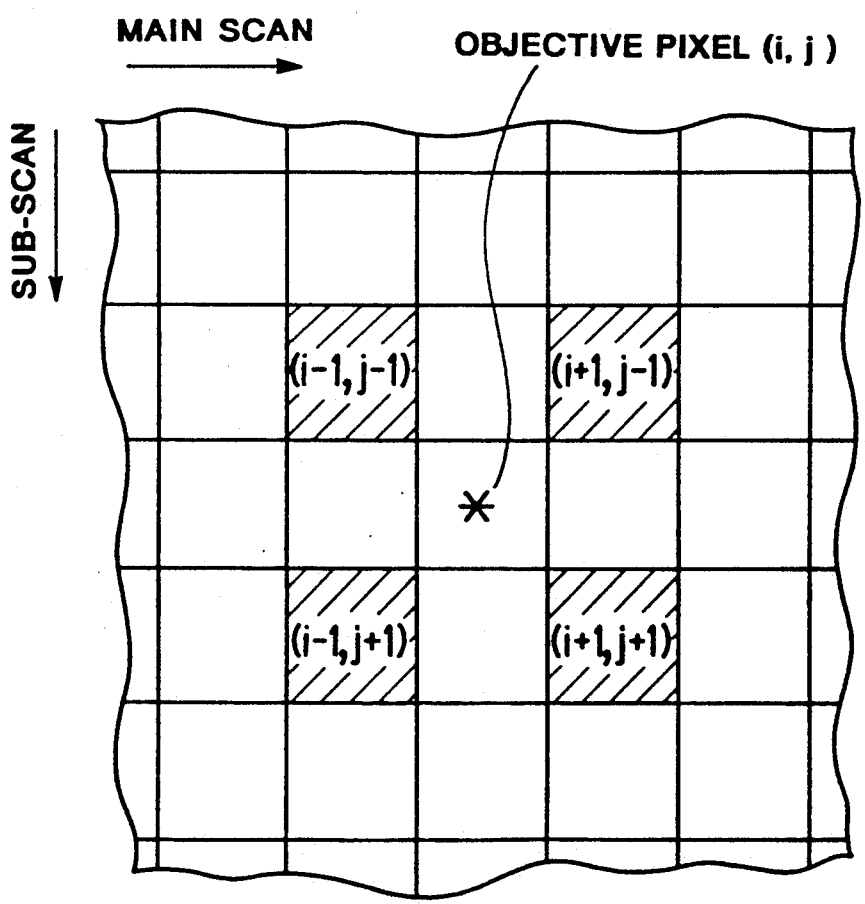

Although details will be described later, in an error diffusion method implemented in the first embodiment, if the position of the objective pixel is (i, j), the positions of pixels being subjected to error diffusion are selected as (i+1, j), (i−1, j+1), (i, j+1) and (i+1, j+1). As described above, the presence or absence of an edge is detected by using the objective pixel and the neighboring pixels which correspond to these coordinate positions. However, the detecting method is not limited to the above-described method. For example, as shown in FIG. 4, the difference between the objective pixel (i, j) and each of the neighboring pixels (i+1, j−1), (i+1, j−1), (i−1, j+1) and (i+1, j+1) may be obtained to implement detection of an edge. If an edge portion is to be detected by utilizing the neighboring pixels shown in FIG. 4, another line memory may be added (the total number of line memories becomes two) for the purpose of timing. Moreover, as long as it is possible to detect an edge portion, the manner of selecting pixels for detection of an edge portion is not limited to the manner shown in FIG. 3 or 4.

Referring to FIG. 5, which shows one example of the structure of the binarizing circuit 6 in the first embodiment, the construction and operation of the binarizing circuit 6 are explained below.

The binarizing circuit 6 shown in the figure includes flip-flops (hereinafter referred to simply as "FF(s)") 15a to 15d for latching data, adders 16a to 16d, a line memory 17 for introducing a time delay for one line, a comparator 18, an AND gate 19 and an error-distribution controlling circuit 20.

First of all, the corrected data (original-image data corresponding to the position of the objective pixel (i, j)) is input to the adder 16d through the data line 100. In the adder 16d, the corrected data is added to an error (stored in FF 15) which is to be distributed to the pixel position (i, j). The added value is output to the comparator 18 and the error-distribution controlling circuit 20. The comparator 18 compares the data on a data line 355 with the threshold data supplied from the threshold setting circuit 7 (the signal line 300), and outputs a binarized signal representing the result of this comparison. If the value of the data on the data line 355 is larger than the threshold data, the comparator 18 outputs "1" to a signal line 311; otherwise it outputs "0". The next AND gate 19 performs ANDing of the binarized signal (signal line 311) and the signal (signal line 400) output from the decision circuit 8, and the result of the ANDing is delivered as a signal 500 to the output section 9 and the error-distribution controlling circuit 20.

The signal output from the decision circuit 8 will be described in detail below. To be brief, if the density of an objective pixel is low and if "1 (a dot)" is present in the group of the pixels which neighbor of the objective pixel and which have been output to the output section 9, the signal output from the decision circuit 8 is "0"; otherwise it is "1".

The error-distribution controlling circuit 20 calculates the difference (error) between the signal 355 before binarization and a value obtained by multiplying the value of the binarized signal 500 by 255 (i.e., "0" or "255"). On the basis of the edge signal 200 and the sign (positive or negative) of the pixel concerned, the error-distribution controlling circuit 20 controls outputting of error-amount signals 351 to 354 to be distributed to the neighboring pixels. If the position of an objective pixel is (i, j), the error amounts 351 to 354 are added to the error amounts which have previously been distributed to the respective pixel positions (i−1, j+1), (i, j+1), (i+1, j+1) and (i+1, j) in the corresponding adders 16a to 16d. Although the error amounts are distributed to four of the pixels which neighbor the objective pixel (refer to FIG. 3), this number is only illustrative and error distribution may be performed on, for example, twelve neighboring pixels.

Figure 6:
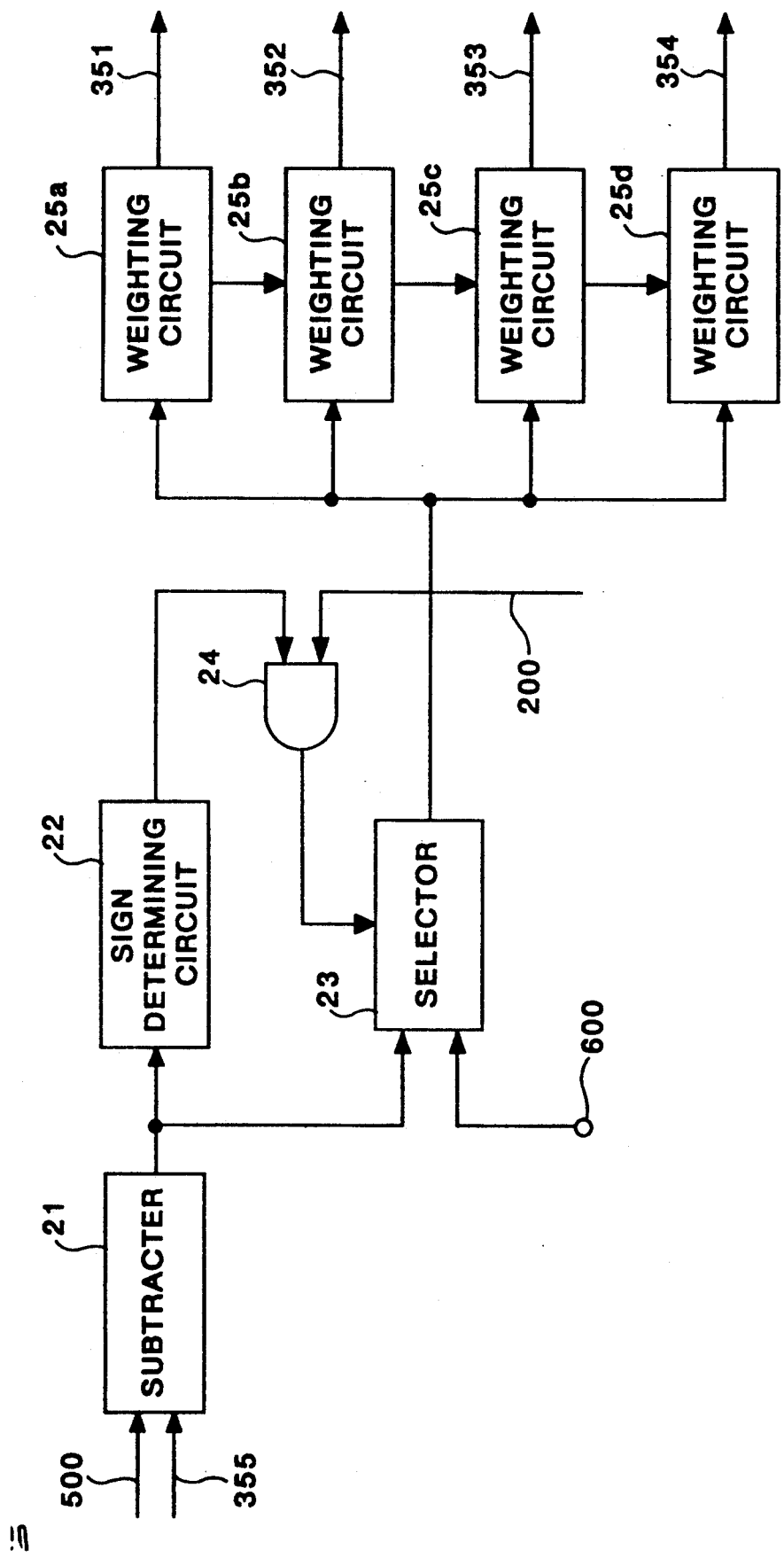
FIG. 6 is a block diagram of the error-distribution controlling circuit shown in FIG. 5.

Referring to FIG. 6 which shows the details of the error-distribution controlling circuit 20, the construction and the operation of the circuit 20 are explained below.

The error-distribution controlling circuit 20 shown in the figure includes a subtracter 21, a sign determining circuit 22 for making a decision as to the sign (negative or positive) of an input signal, a selector 23, an AND gate 24, and weighting circuits 25a to 25d.

The subtracter 21 calculates the difference (error) between the signal 355 before binarization and a value obtained by multiplying the binarized signal 500 by 255:

$$(error) = (signal\ 355) - 255 \times (signal\ 500)$$

The value thus calculated is output to the signal determining circuit 22 and the selector 23.

If the data (calculated value) input to the signal determining circuit 22 is positive, the circuit 22 outputs "0"; otherwise it outputs "1". The AND gate 24 performs ANDing of the signal supplied from the sign determining circuit 22 and the signal 200 (signal supplied from the edge detecting circuit 5). The result of the ANDing is output to the selector 23. More specifically, if the error-added data 355 on an objective pixel which has not yet been binarized by the comparator 18 in the binarizing circuit 6 is not larger than 255×the value of the output data 500 and if the objective pixel is located in an edge portion, the output of the AND gate 24 is "1"; otherwise it is "0".

If the output of the AND gate 245 is "1", the selector 23 selects a signal 600 (a logic level of "0"), while if the output of the AND gate 245 is "0", the selector 23 outputs to the weighting circuits 25a to 25d the subtraction result (error) supplied from the subtracter 21.

The weighting circuits 25a to 25d correspond to the respective pixel positions (i+1, j+1), (i, j+1) and (i−1, j+1) which neighbor the objective pixel (i, j). The weighting circuits 25a to 25d serve to distribute data output from the selector 23 to the positions of the neighboring pixels in accordance with a weighting factor.

Specifically, the weighting circuits 25a and 25c calculate 1/6 the error amount which has been output from the selector 23, and output the respective results as the signals 351 and 353. The weighting circuits 25b and 25d calculate ⅓ the error amount which has been output from the selector 23, and output the respective results as the signals 352 and 354. Of course, if the output of the AND gate 24 is "1", the signal 600 is selected so that the amount of error to be distributed to each neighboring pixel is set to "0".

With the above-described processing, even if a negative error amount occurs in an edge portion, the negative error amount is not distributed to any neighboring pixel. Accordingly, it is possible to prevent the phenomenon in which no dot is plotted and a white void occurs, which phenomenon has heretofore occurred in a low-density portion of an edge portion.

Although the weighting factors of the weighting circuits 25a to 25d are 1/6 or ⅓, these numbers are not restrictive and may of course be arbitrarily changed. For example, if ½$^m$ (m=0, 1, 2, ...) is used, the above-described weighting can be achieved by using a simple shift circuit and it is also possible to improve the processing speed.

Figure 7:
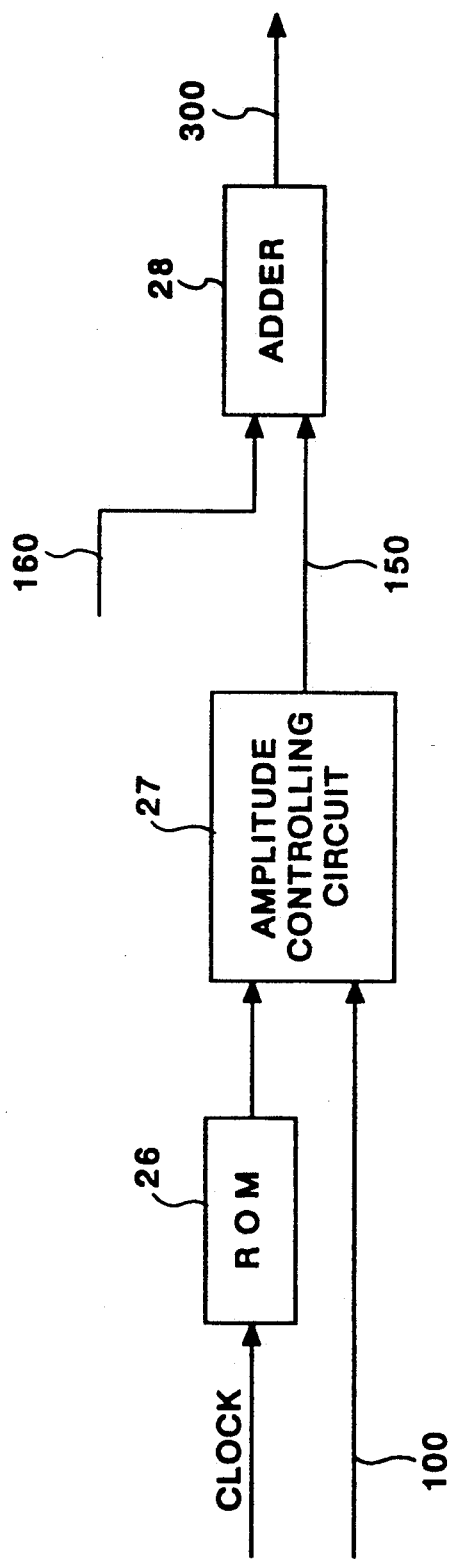
FIG. 7 is a block diagram of a threshold setting circuit in the embodiment.

FIG. 7 shows one example of the structure of the threshold setting circuit 7 in the first embodiment.

As explained previously, the output 300 from the threshold setting circuit 7 is used as a threshold by the comparator in the binarizing circuit 6.

The following is an explanation of the principle of generation of such a threshold.

In FIG. 7, reference numeral 26 denotes a ROM which stores a set of thresholds (for example, a dither matrix of 16×16), and outputs any one of −127 to +127. An amplitude controlling circuit 27 controls the value of the threshold output from the ROM 26 in accordance with the value of the signal 100 (data output from the line memory 4). Specifically, the amplitude controlling circuit 27 selects, in accordance with the value of the signal 100, an appropriate value from among the values AL listed in the following table, multiplies the selected value AL by the value output from the RAM 26, and outputs the result as a signal 150. The signal 150 is added to a signal 160 (=127) in an adder 28, which in turn outputs the result as the threshold signal 300.

TABLE 1

| Signal 100 | AL |
|---|---|
| 0 | 0 |
| 1 to 5 | 1.0 |
| 6 to 10 | 0.8 |
| 11 to 20 | 0.5 |
| 21 to 30 | 0.2 |
| 31 to 255 | 0.1 |

By executing the above-described control, it is possible to generate a small threshold in a low-density portion in a certain probability. Accordingly, it is possible to prevent the phenomenon in which no dot is plotted and a white void occurs, which phenomenon has heretofore occurred in the low-density portion.

Although the values stored in the ROM 26 consist of dither signals of −127 to +127, they may be represented by random numbers of −127 to +127 and are not limited to the examples described above. Moreover, as long as the values of AL (which range between 0 and 1) are made smaller in a lower-density portion and larger in a higher-density portion, the values of AL are not limited to those listed in the above table. Although the signal 100 is divided in 6 steps, the number of division steps is not limited to the above number and may be arbitrarily selected. In addition, in order to reduce the scale of the multiplier circuit, the value of AL may be represented by a power of 2 or the sum of powers of 2.

Figure 8:
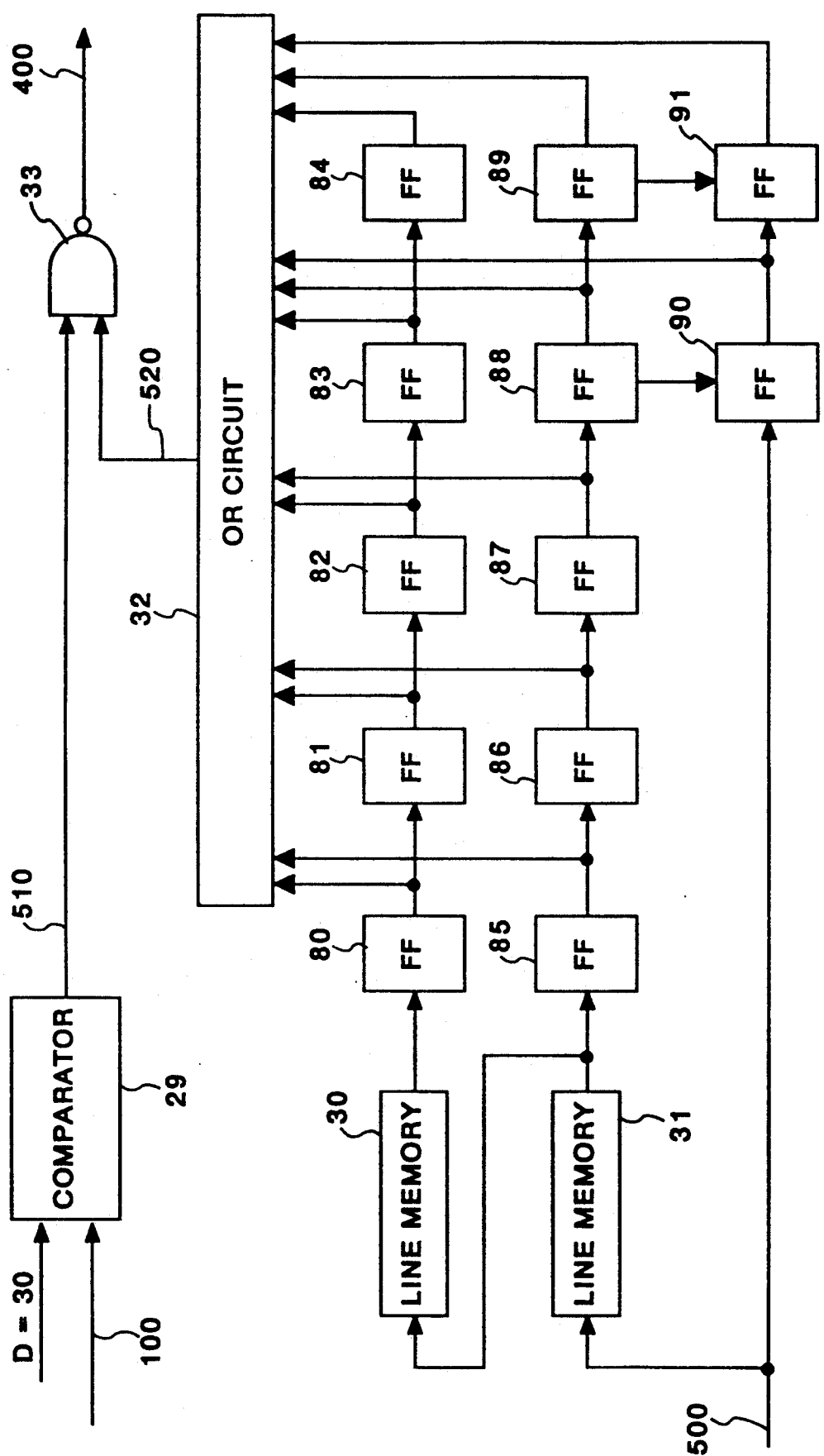
FIG. 8 is a block diagram of a decision circuit in the embodiment.

Next, the decision circuit 8 in the first embodiment will be explained with reference to FIG. 8.

The decision circuit 8 includes a comparator 29, line memories (FIFO) 30 and 31, an OR circuit 32, a NAND gate 33, and flip-flops 80 to 91 for latching data.

The binarized output signal 500 is input to the line memory 31 and, at the same time, is latched by FF 90. A signal read from the line memory 31 is likewise input to the line memory 30 and, at the same time, is latched by FF 85. If the position of an objective pixel to be processed is (i, j), binarized data twelve pixels which neighbor the objective pixel:

(i−2, j−2), (i−1, j−2), (i, j−2), (i+1, j−2), (i+2, j−2), (i−2, j−1), (i−1, j−1), (i, j−1), (i+1, j−1), (i+2, j−1), (i−2, j), (i−1, j)

are latched by FFs 80 to 91. These latched data on the twelve pixels are input to the OR circuit 32. The OR circuit 32 performs ORing of these input data and outputs the result as a signal 520. The corrected signal 100 is input to the comparator 29, where it is compared with a threshold D=30. If the signal 100 is larger than the threshold D=30, the comparator 29 outputs "0" as a signal 510; otherwise it outputs "1" as the signal 510. The signals 510 and 520 are input to the NAND gate 33, and the result of the NANDing is output as the signal 400 (a decision made by the decision circuit 8).

In this manner, as explained previously, if the corrected data 100 on the objective pixel has a low density which is "30" or less and if at least one pixel of the twelve neighboring pixels which have previously been output in a binarized form is "1", the output of the NAND gate 33 is "0". Otherwise, the output of the NAND gate 33 is "1".

Accordingly, as can be seen from the explanation of the AND gate 19 in the binarizing circuit 6, it is possible to inhibit a dot from being plotted in the neighborhood of a dot-plotted pixel in a low-density portion. In other words, no dots are plotted excessively close to, or excessively for away from, each other, and it is also possible to reduce noise which may be experienced in a low-density portion by a user.

Explanation of Second Embodiment

Figure 9:
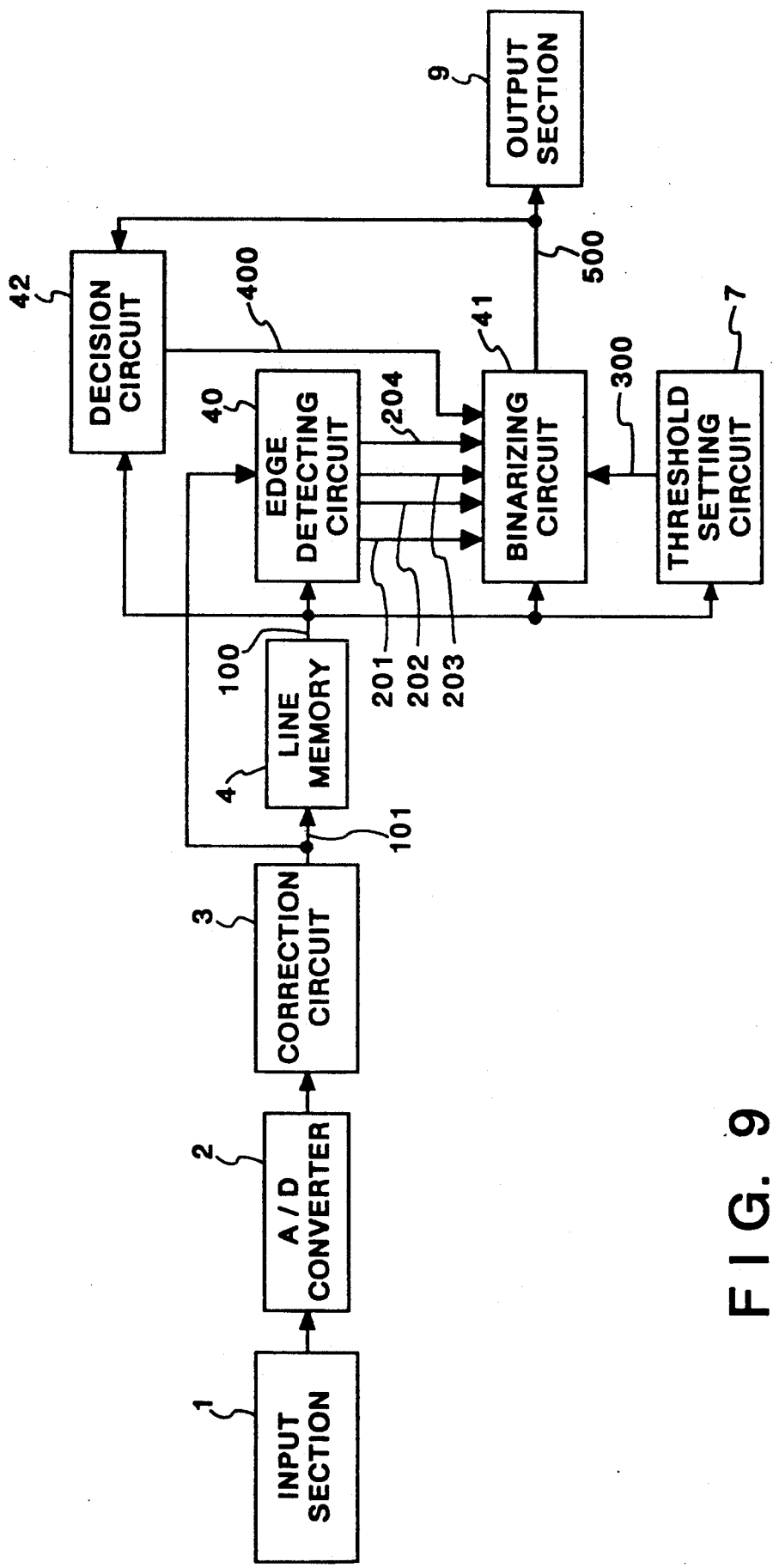
FIG. 9 is a block diagram showing the overall construction of a copying machine to which a second embodiment is applied.

FIG. 9 is a block diagram of a second embodiment in which the edge detecting circuit 5, the binarizing circuit 6 and the decision circuit 8 of the above-described first embodiment are partially modified. In the following description, the same reference numerals are used to denote constituent elements which are the same as those used in the first embodiment, and the description thereof is omitted.

The outline of the processing executed by the second embodiment having the illustrated arrangement and construction is as follows.

The edge detecting circuit 40 makes a decision as to the presence or absence of an edge on the basis of each of the relationships in density between an objective pixel (i, j) and a neighboring pixel at a position (i+1, j), between the objective pixel (i, j) and a neighboring pixel at a position (i−1, j+1), between the pixel (i, j) and a neighboring pixel at a position (i, j+1), and between the pixel (i, j) and a neighboring pixel at a position (i+1, j+1). The results of the decisions made as to the respective relationships are output as the signal 201 as well as signals 202 to 204. A binarizing circuit 41 adds the signal 100 (density data on the objective pixel) to the error distributed to the objective pixel position and then binarizes the result on the basis of the threshold T. Then, the binarizing circuit 41 outputs the binarized signal 500 on the basis of the result of this binarization and the decision signal 400. In addition, the binarizing circuit 41 makes a decision as to the sign (negative or positive) of an error which may occur during the above binarization, and determines the amount of error to be distributed to each of the neighboring pixels on the basis of the result of that decision and the signals 201 to 204.

Figure 10:
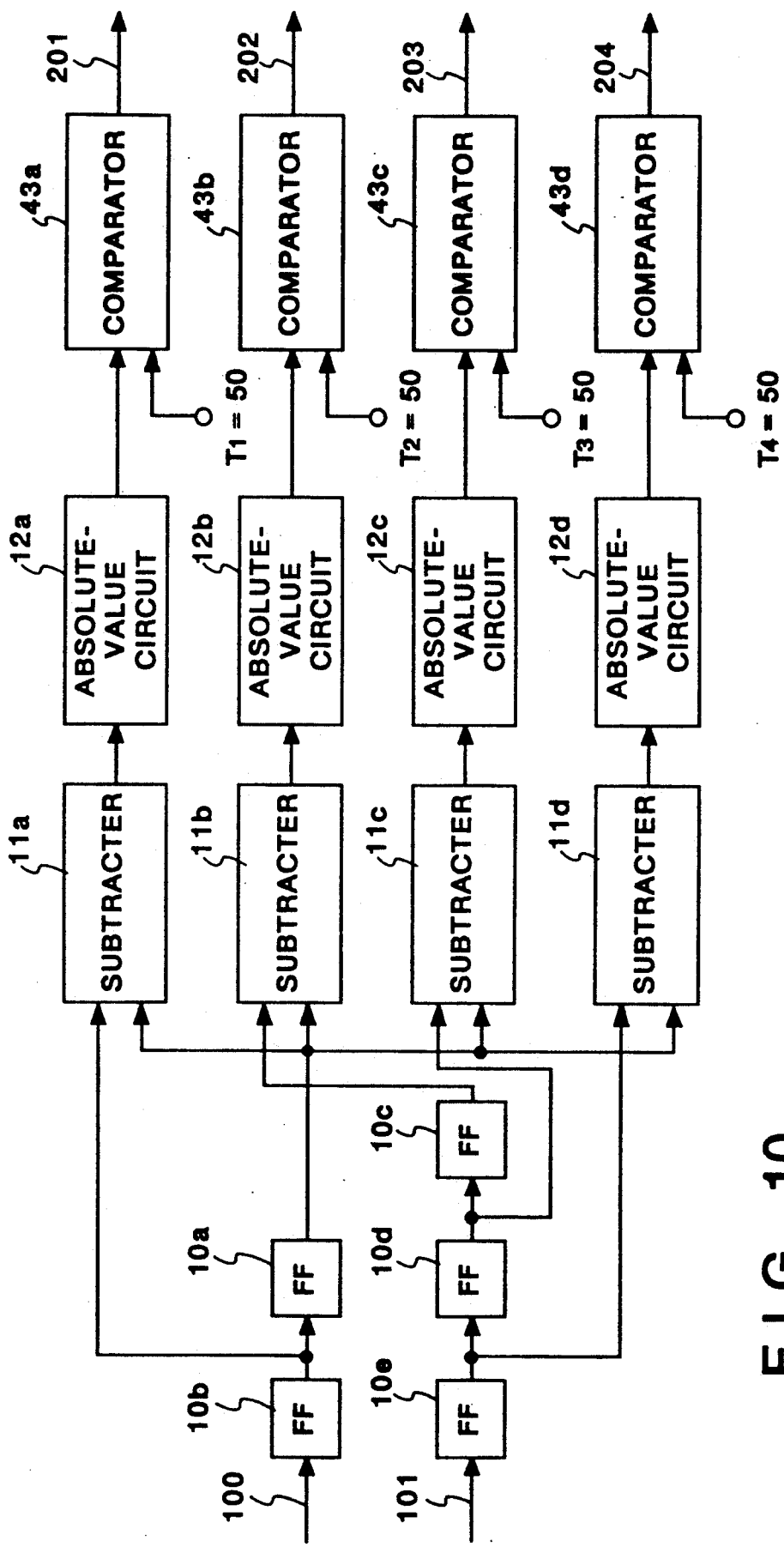
FIG. 10 is a block diagram showing an edge detecting circuit in the second embodiment.

FIG. 10 is a block diagram showing the edge detecting circuit 40. In the figure, the elements denoted by 10a to 10e, 11a to 11d and 12a to 12d are the same as those shown in FIG. 2. Reference numerals 43a to 43d denote comparators for comparing respective input signals with thresholds $T_1$ to $T_4$ (each of which is set to "50" in this embodiment). The comparators 43a to 43d compare values, which are output from the absolute-value circuits 12a to 12d, with the respective thresholds $T_1$ to $T_4$. If a signal input to the comparator 43a is larger than the threshold $T_1$, the comparator 43a outputs "1" as the signal 201; otherwise it outputs "0" as the signal 201. The other comparators 43b to 43d also operate in a similar manner.

With the above arrangement and construction, it is possible to implement edge detection in units of pixels. Accordingly, since negative errors in a portion including no edge are distributed as negative errors, an excessive degree of edge emphasis is prevented.

Figure 11:
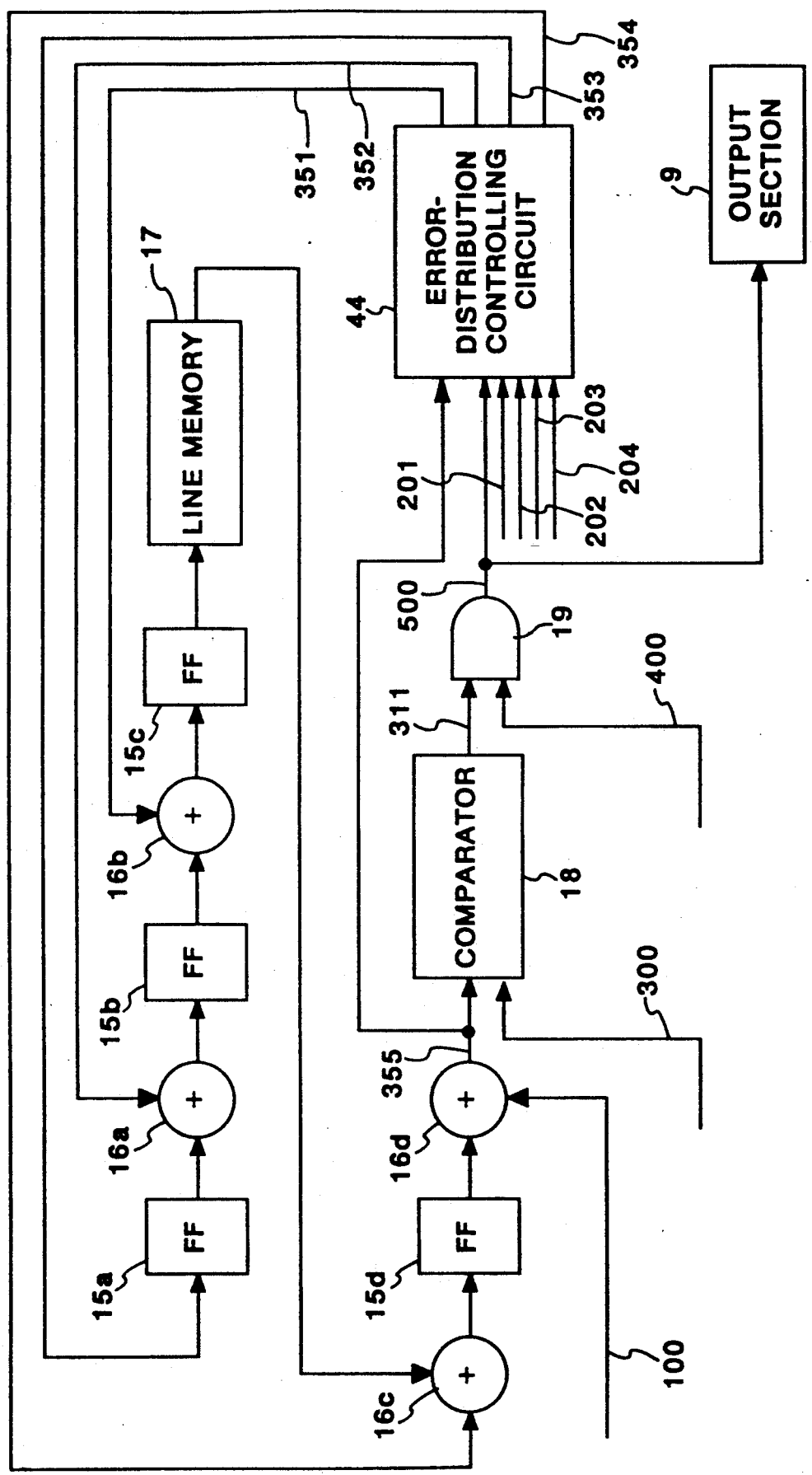
FIG. 11 is a block diagram of a binarizing circuit in the second embodiment.

FIG. 11 is a block diagram showing the binarizing circuit 41, and an error-distribution controlling circuit 44 alone differs from the corresponding element used in the first embodiment described above.

The error-distribution controlling circuit 44 used in the second embodiment calculates the difference (error) between the signal 355 before binarization and a value obtained by multiplying the value of the binarized signal 500 by 255. On the basis of the edge signals 201 to 204 and the sign (positive or negative) of the error concerned, the error-distribution controlling circuit 44 controls the error-amount signals 351 to 354 to be distributed to the neighboring pixels. If the position of an objective pixel is (i, j), the error-amount signals 351 to 354 are added to the error amounts which have previously been distributed to neighboring pixels at positions (i−1, j+1), (i, j+1), (i+1, j+1) and (i+1, j), respectively. Although the errors are distributed to the four pixels which neighbor on the objective pixel, the number of neighboring pixels is not limited to four. For example, twelve pixels may be selected as neighboring pixels.

Figure 12:
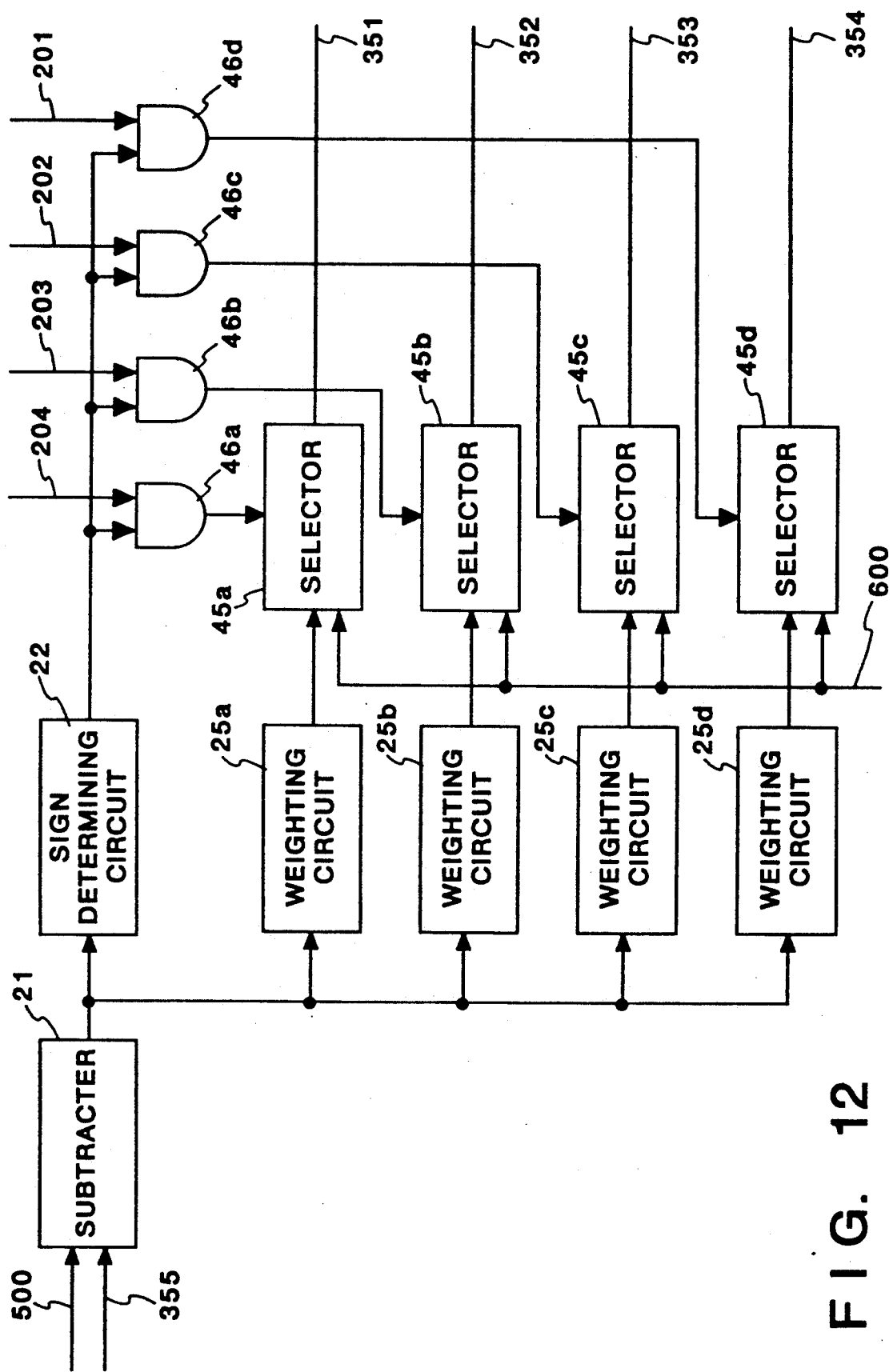
FIG. 12 is a block diagram of the error-distribution controlling circuit shown in FIG. 11.

FIG. 12 is a block diagram of the error-distribution controlling circuit 44.

The subtracter 21 calculates the difference between the signal 355 before binarization and a value obtained by multiplying the value of the binarized signal 500 by 255. The result is input to the sign determining circuit 22 and the weighting circuits 25a to 25d. If the input data is positive, the sign determining circuit 22 outputs "0"; otherwise it outputs "1". AND circuits 46a to 46d perform ANDing of the signals supplied from the sign determining circuit 22 and the respective signals 201 to 204, and the results are output to corresponding selectors 45a to 45d.

If the signal output from the AND circuit 46a is "1", the selector 45a selects the signal 600 (=0), whereas if it is "0", the selector 45a selects the signal output from the weighting circuit 25a. The result of this selection is output as the signal 351. More specifically, if an error which occurs during binarization is negative and if the difference in density between the objective pixel (i, j) and the neighboring pixel (i+1, j+1) is "50" or more, the selector 45a selects the signal 600 (=0) and outputs it as signal 351. Under the conditions other than above, the selector 45a selects the data output from the weighting circuit 25a and outputs it as the signal 351. The selectors 45b and 45d also operate in a similar manner, that is to say, if the signal supplied from each of the AND gates 46b to 46d to a corresponding one of the selectors 45b to 45d is "0", the selector selects and outputs the value from a corresponding one of the weighting circuits 25b to 25d, while, in the case of "1", the selector selects the signal 600. The results of these selections are output as the signals 352 to 354 similar to the signal signal 351.

With the above-described arrangement and construction, since no negative error amount is distributed to the neighboring pixels in an edge portion, it is possible to prevent the phenomenon in which an image may be partially omitted in a low-density portion of an edge portion. In addition, with the above-described arrangement and construction, it is possible to make a decision as to the presence or absence of an edge portion on the basis of the relationships between an objective pixel and individual pixels to which errors are to be distributed. Accordingly, since a negative error is not cut off (i.e., no positive error is added) in a portion including no edge, it is possible to prevent an excessive degree of edge emphasis.

Figure 13:
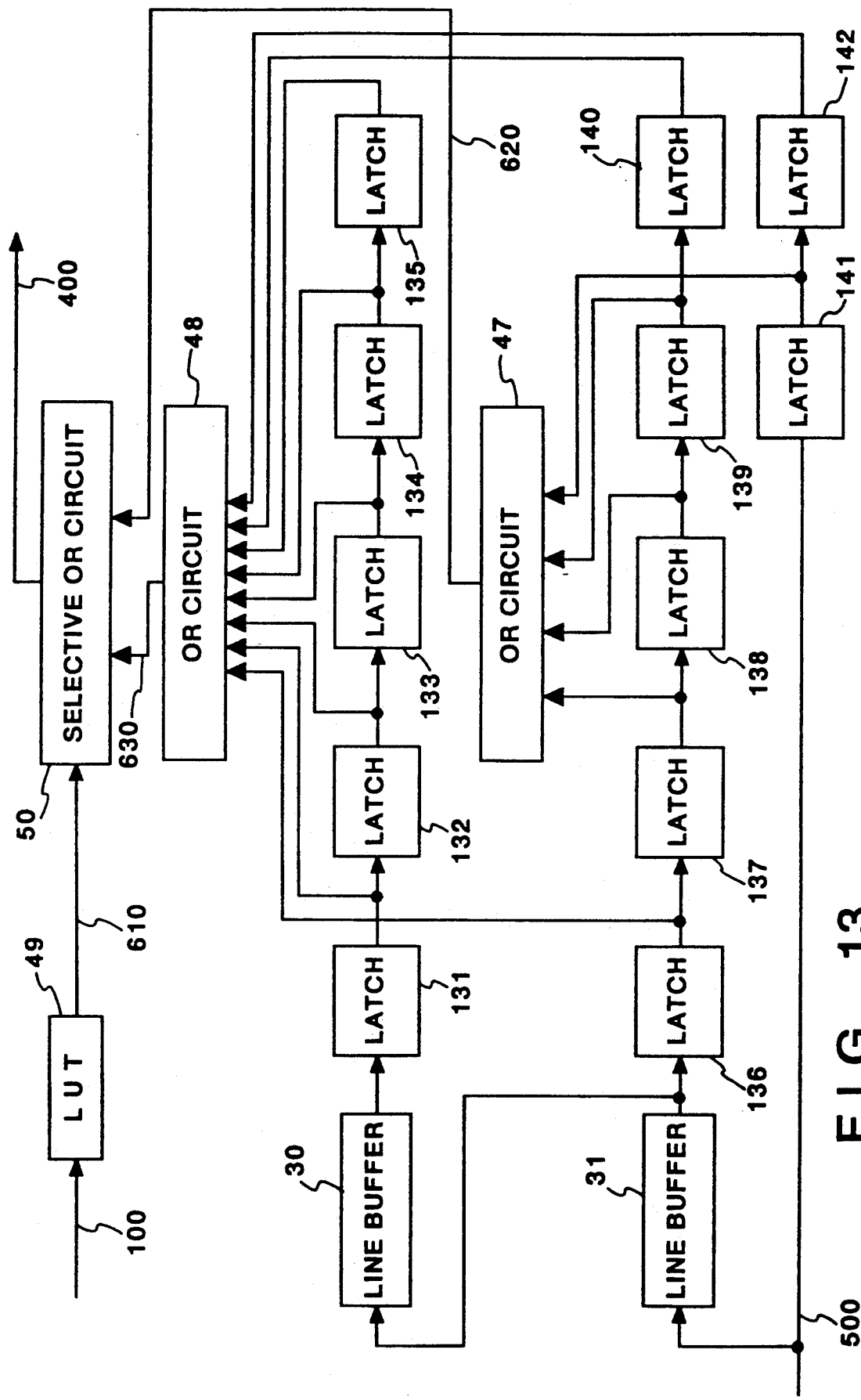
FIG. 13 is a block diagram of a decision circuit in the second embodiment.

FIG. 13 is a block diagram showing the decision circuit 42 used in the second embodiment.

The binarized output signal 500 is input to a line buffer 31 and, at the same time, is latched by FF 141. A signal read from the line buffer 31 is likewise input to the line buffer 30 and, at the same time, is latched by FF 136. If the position of an objective pixel to be processed is (i, j), binarized data twelve pixels which neighbor on the objective pixel:

(i−2, j−2), (i−1, j−2), (i, j−2), (i+1, j−2), (i+2, j−2), (i−2, j−1), (i−1, j−1), (i, j−1), (i+1, j−1), (i+2, j−1), (i−2, j), (i−1, j)

are held in FFs 131 to 142.

An OR circuit 47 performs ORing of the binarized data on the four pixels at the following pixel positions:

(i−1, j−1), (i, j−1), (i+1, j−1), (i−1, j)

and outputs the result as a signal 620.

An OR circuit 48 performs ORing of the binarized data on the eight pixels at the following pixel positions:

(i−2, j−2), (i−1, j−2), (i, j−2), (i+1, j−2), (i+2, j−2), (i−2, j−1), (i+2, j−1), (i−2, j)

and outputs the result as a signal 630.

An LUT (look-up table) 49 outputs a switching signal 610 of three levels in accordance with the input corrected signal 100. The switching signal 610 is set to "1" when the corrected signal 100 ranges between 1 and 20, to "2" when it ranges between 21 and 50, and to "0" when it is 51 or more or 0.

An selective OR circuit 50 outputs the decision signal 400 in response to the switching signal 610 output from the LUT 49. If the switching signal 610 is "0", the selective OR circuit 50 outputs "0"; if the switching signal 610 is "2", the circuit 50 outputs the value of the signal 620 (the output from the OR circuit 47); and, if the switching signal 610 is "1", the circuit 50 outputs a value obtained by ORing the signal 620 and the signal 630 (the output from the OR circuit 48).

For example, if the value of the corrected signal 100 is "36", the switching signal 610 is "2". At this time, if the signal 620 is "0" with the signal 630 "1", the decision signal 400 is "0".

In other words, an area which is to be referred to with respect to the value of the corrected signal 100 is set in three steps (that is to say, the three steps of examining none of the neighboring pixels, four of the neighboring pixels, and twelve of the neighboring pixels). If a line buffer, a latch or an OR circuit is added as required, it is possible to set an area to be referred to in multiple steps.

An as example, the setting of four steps can be realized in the following manner. The position of an objective pixel to be processed is assumed to be (i, j).

Moreover, it is assumed that the required line buffers and latches are incorporated to hold binarized data on twenty four pixels which neighbor on the objective pixel:

(i−3, j−3), (i−2, j−3), (i−1, j−3), (i, j−3), (i+1, j−3), (i+2, j−3), (i+3, j−3), (i−3, j−2), (i−2, j−2), (i−1, j−2), (i, j−2), (i+1, j−2), (i+2, j−2), (i+3, j−2), (i−3, j−1), (i−2, j−1) (i−1, j−1), (i, j−1), (i+1, j−1), (i+2, j−1), (i+3, j−1), (i−3, j), (i−2, j), (i−1, j)

It is also assumed that there are provided three OR circuits a to c and a single selective OR circuit d (not shown). In this arrangement, the OR circuit a performs ORing of the binarized data on the four pixels at the pixel positions (i−1, j−1), (i, j−1), (i+1, j−1), (i−1, j) and outputs the result as a signal e. The OR circuit b performs ORing of the binarized data on the eight pixels at the pixel positions (i−2, j−2), (i−1, j−2), (i, j−2), (i+1, j−2), (i+2, j−2), (i−2, j−1), (i+2, j−1), (i−2, j) and outputs the result as a signal f. The OR circuit c performs ORing of the binarized data on the twelve pixels at the pixel positions (i−3, j−3), (i−2, j−3), (i−1, j−3), (i, j−3), (i+1, j−3), (i+2, j−3), (i+3, j−3), (i−3, j−2), (i+3, j−2), (i−3, j−1), (i+3, j−1), (i−3, j), and outputs the result as a signal g.

The selective OR circuit d may be arranged to output, as a decision signal, the signal e when the corrected signal 100 ranges between 21 and 50, the result obtained by ORing the signal e and the signal f when the corrected signal 100 ranges between 11 and 20, the result obtained by ORing the signal e, the signal f and the signal g when the corrected signal 100 ranges between 1 and 10, and "0" when the corrected signal 100 is 51 or more or 0. Although the corrected signal 100 is set in the four steps: a level of 1 to 10; a level of 11 to 20; a level of 21 to 50; and a level of 51 or more or 0, this manner of determining the steps is only illustrative, and any other method may of course be employed.

Explanation of Third Embodiment

In accordance with either of the above-described first and second embodiments, it is possible to suppress the occurrence of white voids and a roughly granular texture in a low-density portion and it is also possible to prevent the phenomenon in which no dot is plotted and white voids occurs in an edge portion of a character or a line drawing. However, there is a case where a notch may be formed in an edge portion of the character or the line drawing.

A third embodiment which will be explained below is designed to prevent a notch from occurring in the edge portion of a character, a line drawing or the like.

Figure 14:
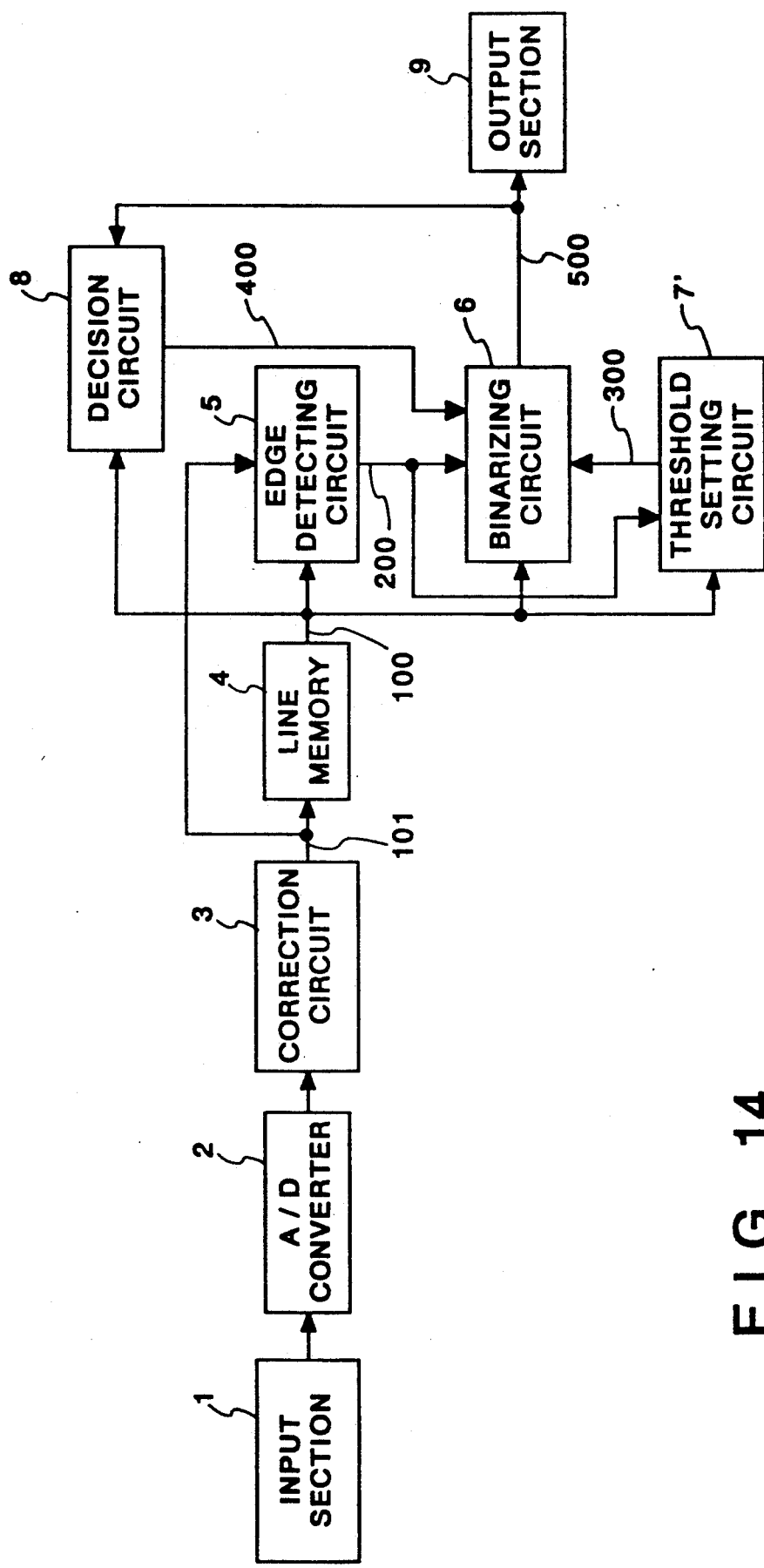
FIG. 14 is a block diagram showing the overall construction of a copying machine to which a third embodiment is applied.

FIG. 14 is a block diagram showing the third embodiment in which the threshold setting circuit 7 of the first embodiment described above is partially modified. In the following description, the same reference numerals are used to denote constituent elements which are the same as those used in the first embodiment, and the description thereof is omitted.

The outline of the processing executed by the third embodiment having the illustrated arrangement and construction is as follows.

The edge detecting circuit 5 determines whether or not an objective pixel is positioned in an edge portion. If it is determined that the objective pixel is positioned in the edge portion, the edge detecting circuit 5 outputs a signal of "1" as the output signal 200. On the other hand, if it is determined that the objective pixel is positioned in the portion other than the edge portion, the edge detecting circuit 5 outputs a signal of "0" as the output signal 200. The signal 200 output from the edge detecting circuit 5 is output to the binarizing circuit 6 and also to a threshold o 20 setting circuit 7'. In the third embodiment, the threshold L setting circuit 7' is arranged to generate not a variable threshold but a fixed threshold (=127) if the edge detecting circuit 5 determines that the objective pixel is positioned in the edge portion of a character, a line drawing or the like. Accordingly, since no small threshold is generated in the vicinity of the edge of the character, the line drawing or the like, it is possible to prevent the binarized output signal 500 from being easily set to "1". Incidentally, since the fixed threshold is exceeded in a black portion which constitutes a character shape, a line drawing or the like, there is no problem.

Figure 15:
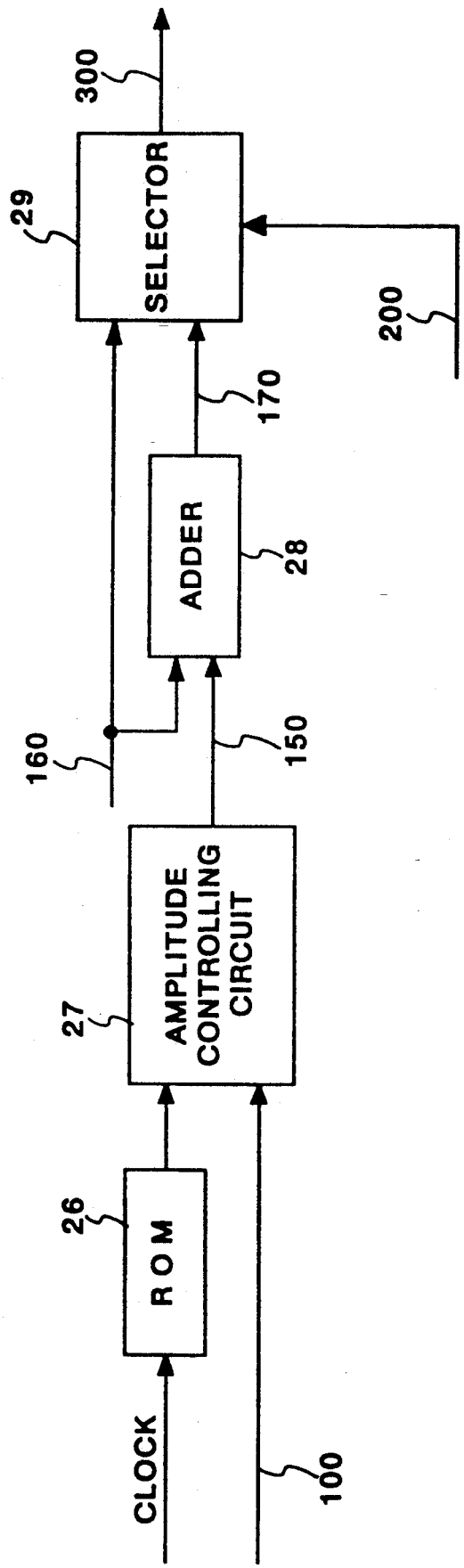
FIG. 15 is a block diagram of a threshold setting circuit in the third embodiment.

FIG. 15 shows an example of the structure of the threshold setting circuit 7' used in the third embodiment, and the operation thereof is explained below.

As shown in the figure, in the third embodiment, a selector 29 is newly added to the threshold setting circuit 7 of the first embodiment. Incidentally, since the ROM 26, the amplitude controlling circuit 27 and the adder 28 have previously been explained, the description of these elements is omitted.

In this arrangement, the adder 28 outputs, as a signal 170, data on a variable threshold centered at the threshold 127 (supplied to the line 160). This signal 170 is supplied to one input terminal of the next selector 29, while a signal 160 is input to the other terminal of the selector 29. The selector 29 selects one of these two signals (data) on the basis of the detection signal 200 supplied from the edge detecting circuit 5, and outputs the signal 300 as threshold data. In other words, if the detection signal 200 is "0" (non-edge portion), the selector 29 outputs, as the threshold 300, the signal 170 representing the result of the addition. If the detection signal 200 is "1" (edge portion), the selector 29 outputs the fixed value "127" as the threshold signal 300.

By executing the above-described processing, the fixed threshold is selected in the edge portion of a character, a line drawing or the like. Thereafter, binarization is carried out. The process of binarization has previously been described in the explanation of the first embodiment and the description thereof is therefore omitted. As described above, if it is determined that the objective pixel is positioned in the vicinity of an edge, neither a variable threshold nor a small threshold is generated. Accordingly, it is possible to eliminate the phenomenon (notch) in which a dot is plotted in the edge portion of a character, a line drawing or the like (to be precise, in a low-density portion of the edge portion).

Explanation of Fourth Embodiment

Figure 16:
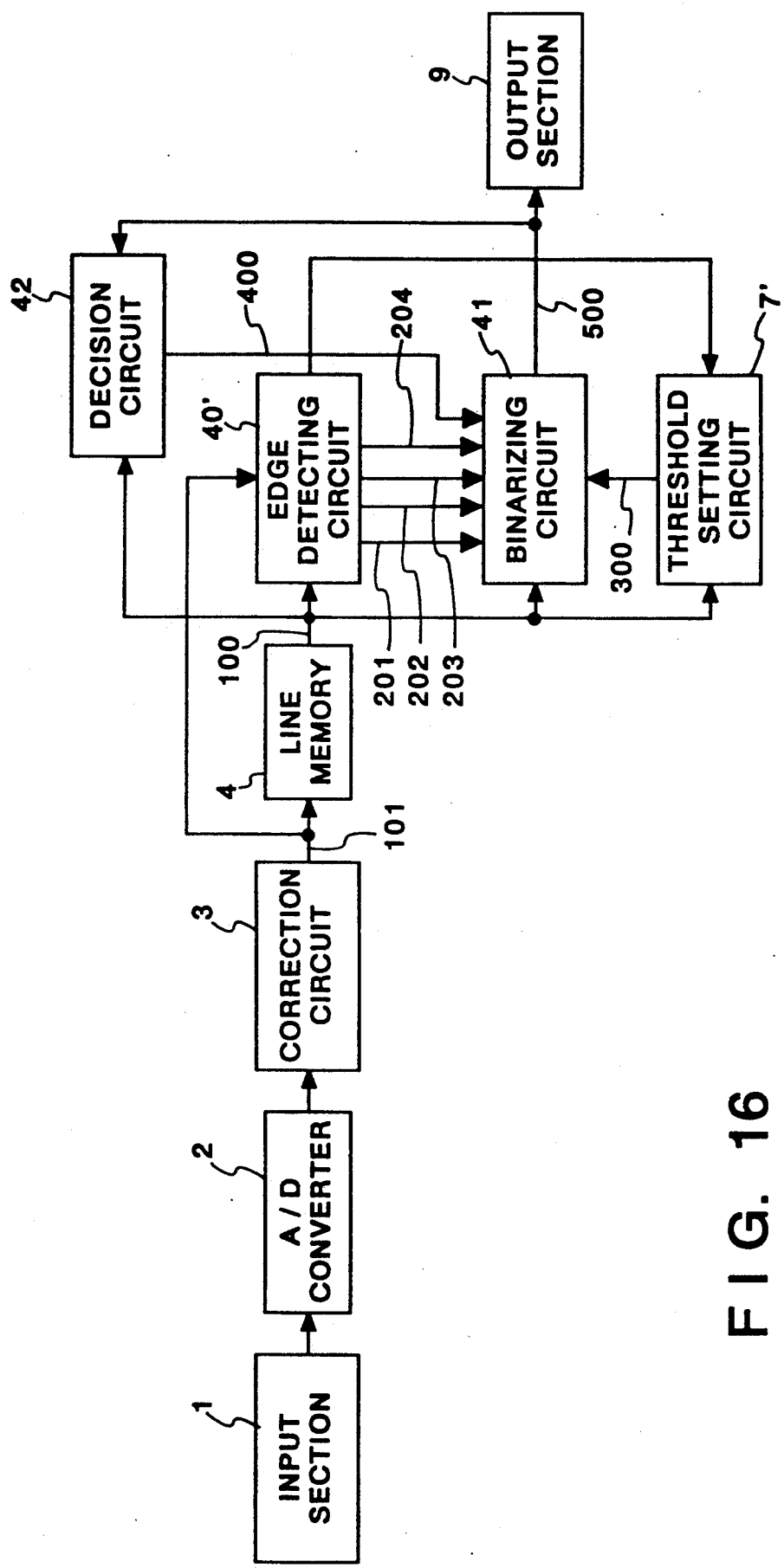
FIG. 16 is a block diagram showing the overall construction of a copying machine to which a fourth embodiment is applied.

FIG. 16 is a block diagram showing a fourth embodiment in which the edge detecting circuit 5 used in the third embodiment described above is partially modified and the binarizing circuit 6 of the second embodiment is used. In the following description, the same reference numerals are used to denote constituent elements which are the same as those used in the first embodiment, and the description thereof is omitted.

The outline of the processing executed by the fourth embodiment having the illustrated arrangement and construction is as follows.

An edge detecting circuit 40' makes a decision as to the presence or absence of an edge on the basis of each of the relationships in density between an objective pixel (i, j) and a neighboring pixel at a position (i+1, j), between the objective pixel (i, j) and a neighboring pixel at a position (i−1, j+1), between the objective pixel (i, j) and a neighboring pixel at a position (i, j+1), and between the objective pixel (i, j) and a neighboring pixel at a position (i+1, j+1). The results of the decisions made as to the respective relationships are output as the signals 201 to 204. As describe previously in connection with the second embodiment, the binarizing circuit 41 binarizes the total sum of errors distributed to the objective pixel and the sum of the signal 100 (density data on the objective pixel) on the basis of the threshold T. Then, the binarizing circuit 41 provides the binarized output signal 500 on the basis of the result of this binarization and the decision signal 400. In addition, this binarizing circuit 41 makes a decision as to the sign (positive or negative) of an error which occurs during binarization, and determines the amounts of errors to be distributed to the neighboring pixels on the basis of the signals 201 to 204 and the result of this decision.

FIG. 17 is a block diagram showing the edge detecting circuit 40' and differs from FIG. 10 in that an OR gate 44 is added. The OR gate 44 serves to generate the signal 200 indicative of whether the objective pixel is positioned in an edge portion, on the basis of the relationship between the objective pixel and each of the neighboring pixels.

Corrected data on the objective pixel and neighboring pixels are held in FF 10a to FF 10e, respectively. Subtracters 11a to 11d calculate the differences between the objective picture position and the respective neighboring pixels, and the next absolute value circuits 12a to 12d calculate edge amounts with respect to the individual neighboring pixels. The edge amounts of the objective pixel position and the individual pixels are output to the binarizing circuit 41 as the signals 201 to 204, and the signal 200 obtained by ORing these signals is output to the threshold setting circuit 7'.

With the above arrangement and construction, it is possible to implement edge detection in units of pixels. Accordingly, since negative errors in a portion including no edge are distributed as negative errors, an excessive degree of edge emphasis is prevented.

Incidentally, the binarizing circuit 41 and the decision circuit 42 are the same as those explained in connection with the second embodiment, and the threshold setting circuit 7' is the same as that used in the third embodiment. Accordingly, the detailed description of them is omitted.

With the above-described arrangement and construction, since no negative error amounts are distributed to the neighboring pixels in an edge portion, it is possible to prevent the phenomenon in which an image may be partially omitted in a low-density portion of the edge portion. In addition, with the above-described arrangement and construction, it is possible to make a decision as to the presence or absence of an edge portion on the basis of the relationships between an objective pixel and individual pixels to which errors are to be distributed. Accordingly, since a negative error is not cut off (i.e., no positive error is added) in a portion including no edge, it is possible to prevent the density from increasing in an area whose density is flat.

Explanation of Fifth Embodiment

Figure 18:
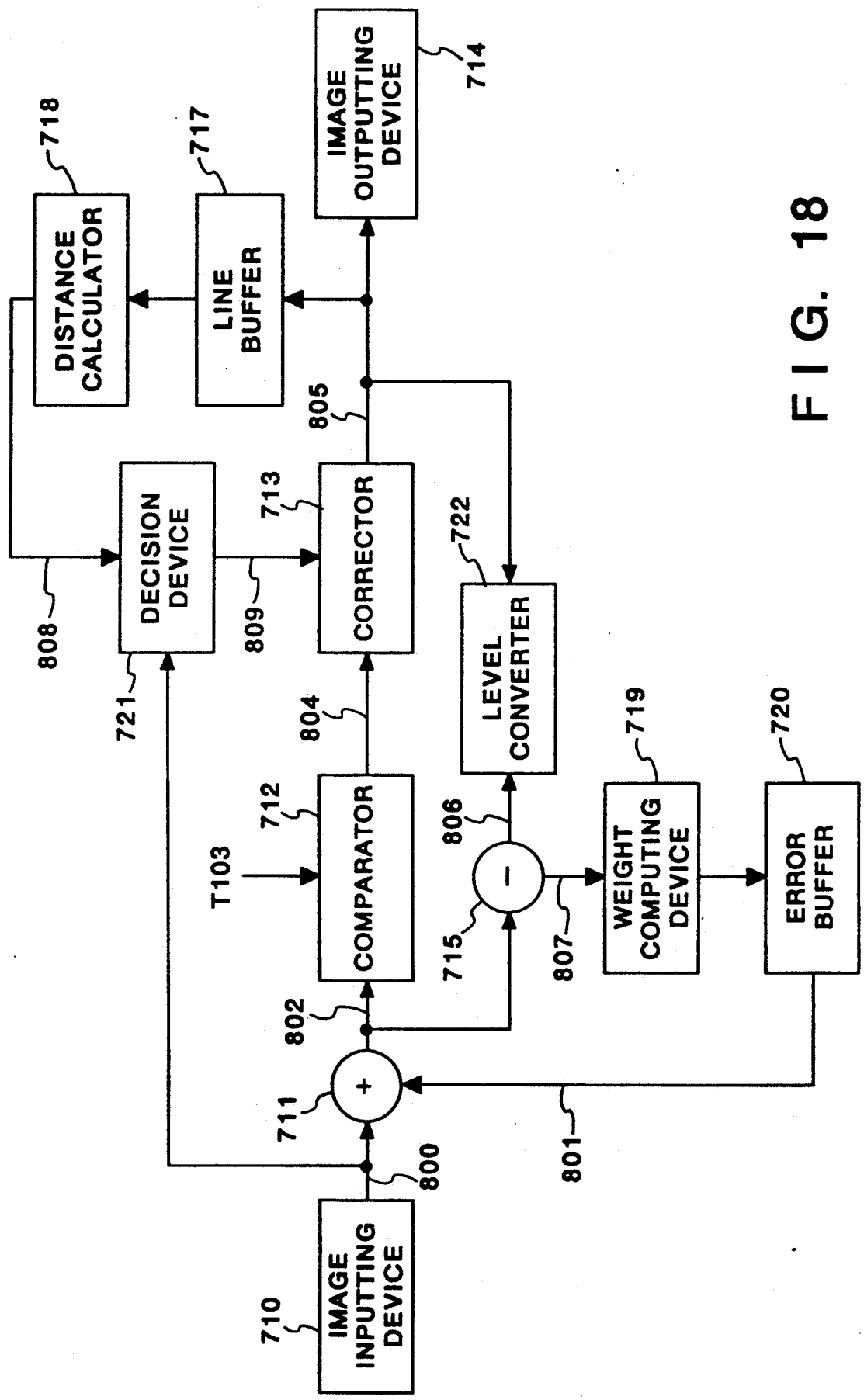
FIG. 18 is a block diagram showing a fifth embodiment of an image processing apparatus in accordance with the present invention.

FIG. 18 is a block diagram of an image processing apparatus (copying machine) to which the fifth embodiment is applied.

In the illustrated image processing apparatus, an image input device 710 serves to read an image from an original document and output, for example, an 8-bit image signal 800, and an adder 711 is disposed to add the image signal 800 to an error signal 801 distributed from each neighboring pixel and accumulated in an error buffer 720 and then to output a corrected image signal 802. A comparator 712 compares the corrected image signal 802 with a predetermined threshold T103. If the value of the image signal 802 is equal to or greater than T, the comparator 712 outputs a binary image signal 804 of a logical level "1", while if the value of the image signal 802 is less than T, the comparator 712 outputs a binary image signal 804 of a logical level "0". A corrector 713 is arranged to directly output the input binary image signal 804 when a decision signal 809 which will be described later is at a logical level "0", while when the decision signal 809 is at a logical level "1", the corrector 713 makes a correction to forcibly set to a logical level "1" the binary image signal 805 to be output. An image output device 714 is arranged to form a dot image in accordance with the binary image signal 805.

A level converter 722 is disposed to restore the output binary image signal 805 to an 8-bit image signal 106. More specifically, if the binary image signal 805 is at a logical level "0", the level converter 722 restores the signal 805 to an image signal 806 of "00000000$_B$ (B denotes a binary number)". If the output binary image signal 805 is at a logical level "1", the level converter 722 restores the signal 805 to an image signal 806 of "11111111$_B$ (=255)". A subtracter 715 is arranged to output an error signal 807, which is generated during binarized printing of an objective pixel, by calculating the difference between the corrected image signal 802 and the output image signal 806. A weight computing device 719 is arranged to distribute, in accordance with a predetermined weighting matrix, the aforesaid error signal 807 to neighboring pixels which have not yet been processed in accordance with a predetermined weighting matrix. An error buffer 720 accumulates the aforesaid distributed error for each neighboring pixel and stores it.

A line buffer 717 accummulates a plurality of lines of output binary image signals 805. A distance calculator 718 calculates the distance between an objective pixel and a processed black pixel located at the shortest distance from the objective pixel, and outputs a distance signal 808. A decision device 721 is arranged to set the optimum distance between black pixels according to the density of the image signal 800 on the original document (that is, the distance by which black pixels are allowed to approach each other in accordance with the density). If the optimum distance between black pixels is greater than the distance indicated by the distance signal 808, the decision device 721 sets the logical level of the decision signal 809 to "1", thereby inhibiting a black pixel from being output in the objective pixel position.

Accordingly, the distances between the adjacent black pixels are prevented from becoming shorter than the optimum distance between black pixels according to the image density on the original document, whereby the image quality can be maintained.

Figure 19:
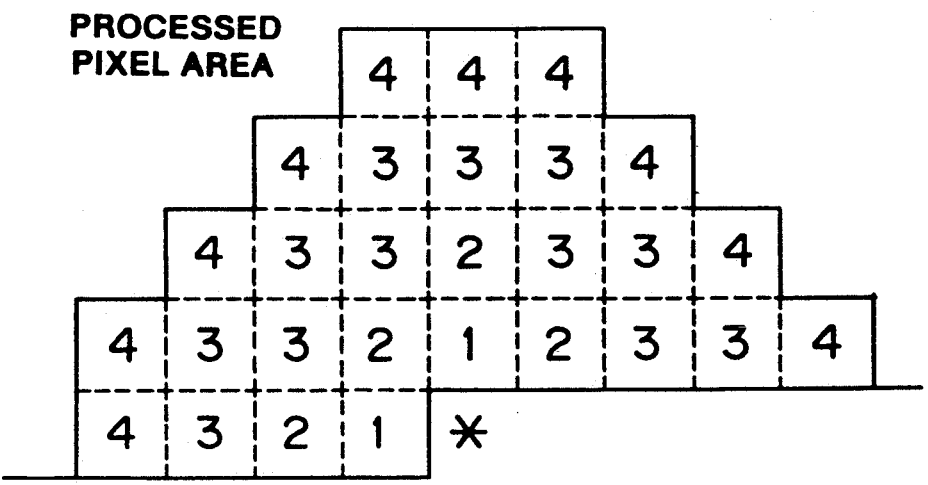
FIG. 19 is a view showing the positional relationship between an objective pixel and processed neighboring pixels.

FIG. 19 shows the relationship between the objective pixel and processed neighboring pixels in the fifth embodiment. In the figure, if the objective pixel is located at the position indicated by symbol "*", the processed neighboring pixels can be divided into four groups in accordance with the respective distances from the objective pixel "*", the respective groups are labelled 1 to 4 in the order of the shortness of the distance.

In a bright area of the image, neighboring pixels which are located at an even longer distance needs to be used to label the pixels even more finely. FIG. 20 is a block diagram showing the details of the distance calculator 718 and the decision device 721 in the fifth embodiment. In the figure, OR circuits are denoted by 730 to 733, and the neighboring pixels labelled "1" to labelled "4" which are read from the line buffer 717 are input in groups to the respective OR circuits 730 to 733. A distance calculator is denoted by 734. When the distance calculator 734 receives signals 835 to 838 output from the respective OR circuits 730 to 733, the distance calculator 734 performs calculations on the distance between the objective distance and a black pixel closest thereto and outputs the result as the shortest-distance signal 808. Specifically, the processing shown in FIG. 1 is carried out.

TABLE 2

| 205 | 206 | 207 | 208 | Distance signal 808 | |
|---|---|---|---|---|---|
| 1 | x | x | x | Distance represented by label 1 | 1 |
| 0 | 1 | x | x | Distance represented by label 2 | 2 |
| 0 | 0 | 1 | x | Distance represented by label 3 | 3 |
| 0 | 0 | 0 | 1 | Distance represented by label 4 | 4 |
| 0 | 0 | 0 | 0 | Distance greater than Distance represented by label 4 | 5 |

In Table 2, if, for example, the output signal 835 of the OR circuit 730 is at a logical level "1", the content of the shortest-distance signal 808 is "1" irrespective of the other output signals 836 to 838. Similarly, if the output signal 837 is at a logical level "0" and the output signal 836 is at a logical level "1", the content of the shortest-distance signal 808 is "2" irrespective of the other output signals 837 and 838. Contents "3" and "4" can be similarly obtained. However, if all the output signals 835 to 838 are at a logical level "0", the shortest distance is greater than the distance labelled "4" and, therefore, the distance calculator 34 assigns "5" to the shortest-distance signal 808.

An optimum-distance table, denoted by 735, outputs a signal 839 indicative of an optimum distance r corresponding to the density D of the original-image signal 800.

Figure 24:
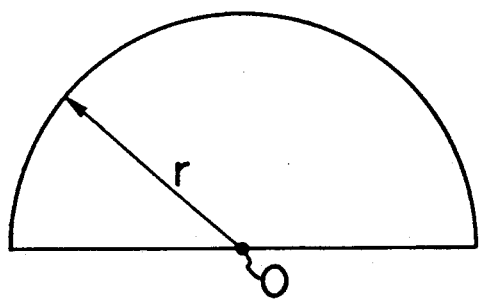
FIG. 24 is a view showing an example of the way of calculating an optimum distance in the fifth embodiment.
Figure 29:
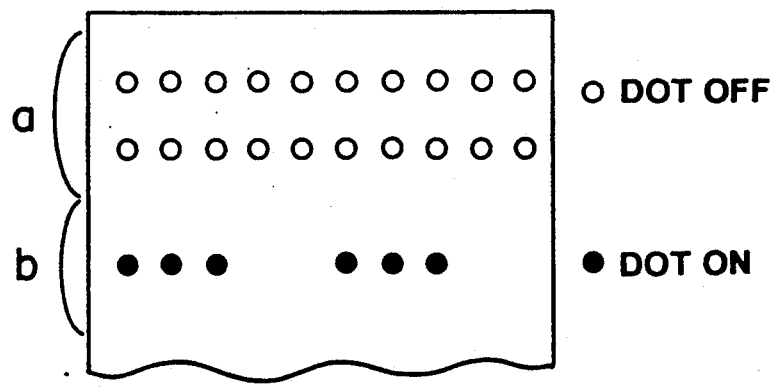
FIG. 29 is a view which serves to illustrate a defect in a conventional error diffusion method.

FIG. 24 is a view showing an example of the way of obtaining the optimum distance r in the fifth embodiment. In the figure, a point 0 represents the position of an objective pixel and r represents a radius (optimum distance). In an area tone representation method, if a single black pixel is present in a specific area such as that shown in FIG. 24, the density D in the specific area is determined. Conversely, if the density D is determined, an area in which a single black pixel is allowed to be present is determined. Specifically, an equation representing the relationship between the image density D (8 bits) and the area of a half circuit is:

$$\frac{\pi r^2}{2} = \frac{256}{D}$$

Accordingly, the radius (distance) r of the half circle in which a single black pixel is allowed to be present is determined by $$r = \frac{16\sqrt{2}}{\sqrt{\pi D}}$$

Table 3 shows an example of the results of this calculation.

TABLE 3

| D | r |
|---|---|
| 1 | 12.8 |
| 2 | 9.0 |
| 10 | 4.0 |
| 20 | 2.8 |
| 100 | 1.3 |
| 255 | 0.8 |

Table 3 represents that, for example, if the original-image density D is 2, no other black pixel is present within a half circle with a radius 9.0 and that, for example, if the original image density D is 20, no other black pixel is present within a half circuit with a radius 2.8.

Referring back to FIG. 20, a comparator, denoted by 736, compares the above-obtained shortest-distance signal with the signal 839 indicative of the optimum distance r. Thus, if the shortest-distance signal 808 is smaller than the optimum-distance signal 209, the comparator 736 sets the decision signal 809 to a logical level "1", thereby forcibly setting the binary output of the relevant objective pixel to a logical level "0" (corresponding to white pixel). If the shortest-distance signal 808 is equal to or greater than the optimum-distance signal 839, the comparator 736 sets the decision signal 809 to a logical level "0", thereby allowing the binary image signal 804 of the objective pixel with the logical level thereof unchanged.

Figure 21:
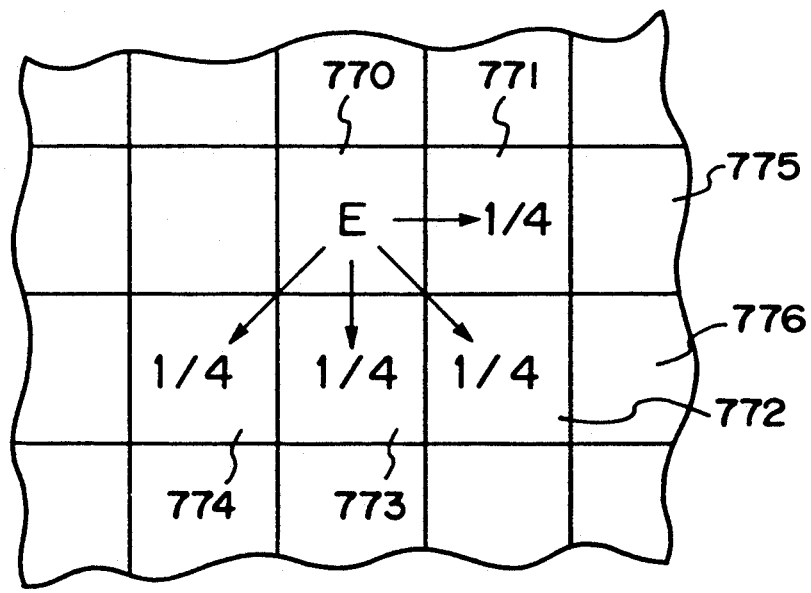
FIG. 21 is a block diagram showing the relationship between a weight computing device and a decision device in the fifth embodiment.

FIG. 21 is a view showing the relationship between the weight computing device 719 and the error buffer 720 in the first embodiment. In the figure, an error signal E which has occurred during the production of a binarized print of an objective pixel 770 is distributed to unprocessed neighboring pixels 771 to 774 so that, for example, ¼ of the error E is assigned to each of the neighboring pixels. The thus-distributed errors are stored in corresponding memory areas. In the next process step, the objective pixel position is shifted to the pixel position 771 and the associated error E is similarly distributed among the unprocessed neighboring pixels 773, 775 and 776. In this manner, the subsequent errors are sequentially calculated in a cumulative manner. Conversely, with respect to a particular objective pixel, the respective error signals distributed from four of processed neighboring pixels are cumulatively calculated in accordance with the individual weights, and the total sum amounts to the error signal 801.

Explanation of Sixth Embodiment

Figure 22:
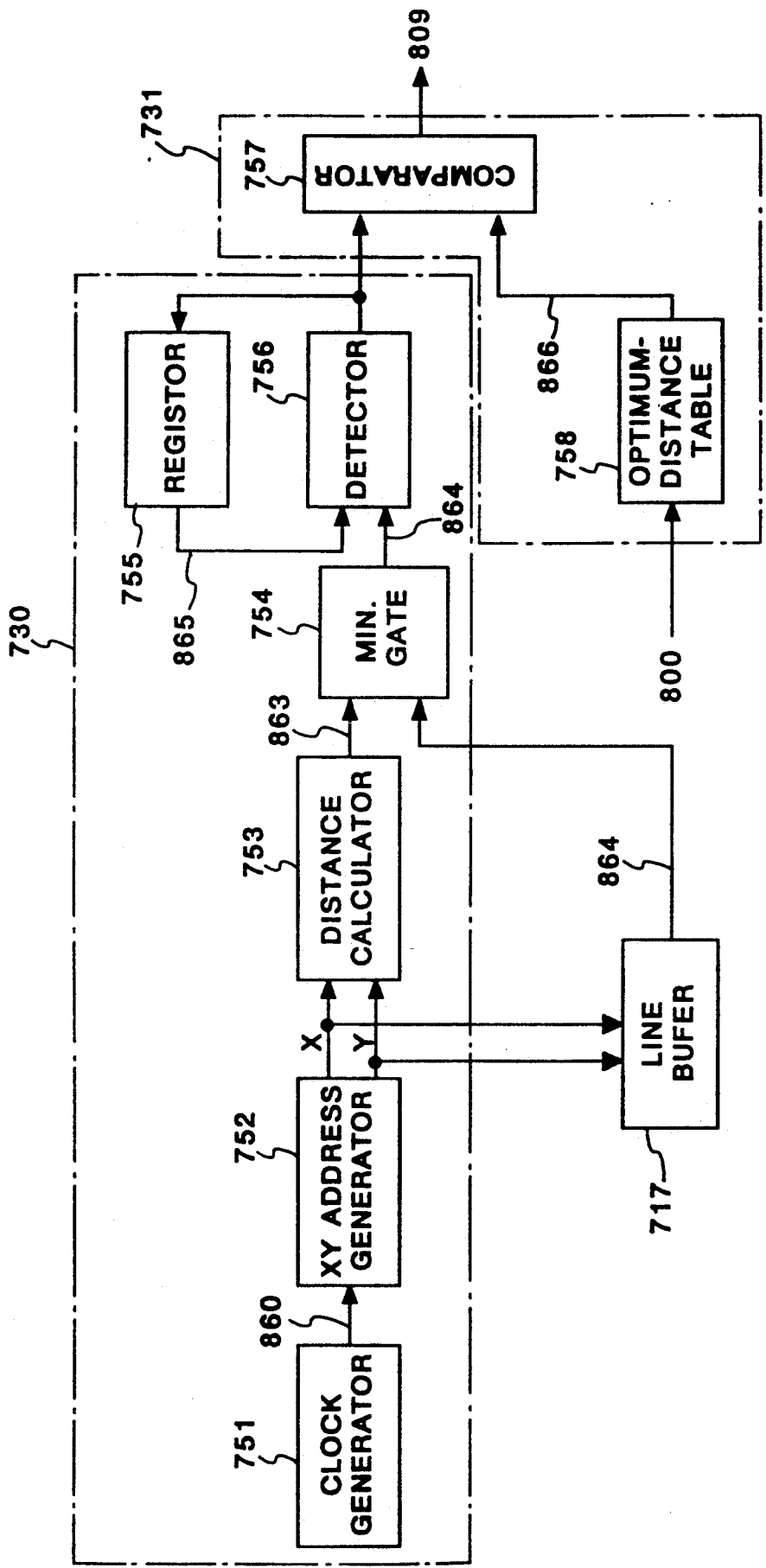
FIG. 22 is a block diagram showing a circuit for calculating the shortest distance in a sixth embodiment.
Figure 23:
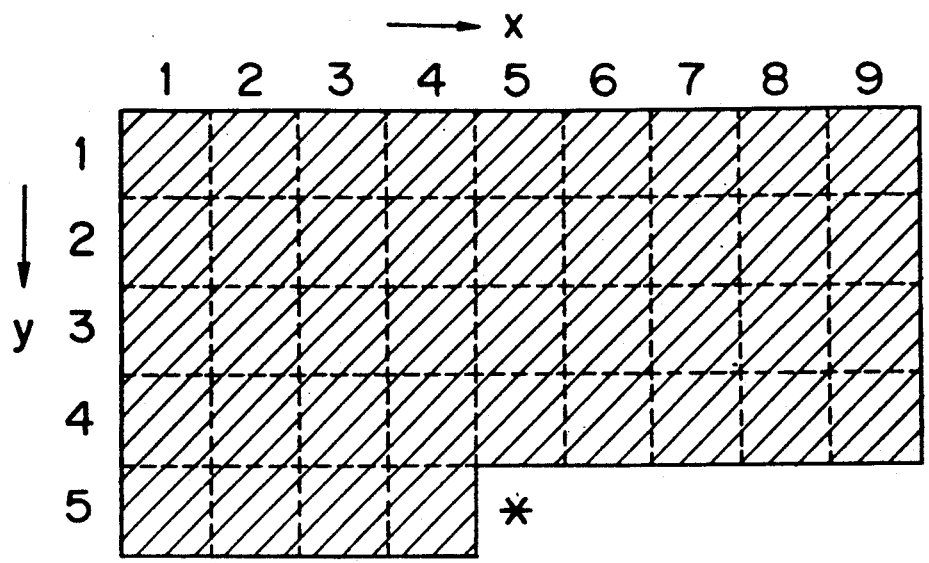
FIG. 23 is a block diagram showing the relationship between an objective pixel and processed neighboring pixels in the sixth embodiment.

FIG. 22 is a block diagram of a circuit for calculating the shortest distance in the sixth embodiment. In the figure, an XY address is denoted by 752, and outputs to a line buffer 717 an address signal (X, Y) of a rectangular form such as that shown by an shaded area in FIG. 23 in accordance with a clock signal 860 supplied from a clock generator 751 (the address signal (X, Y)=(1, 1)→(9, 1), (1, 2)→(9, 2), ..., (1, 5)→(4, 5)). A distance calculator denoted by 753 outputs the distance between the objective pixel position "*" and the address (X, Y) in accordance with the input address signal (X, Y), and a distance signal 863 output from the distance calculator 753 is input to the data terminal of a gate circuit 754. Input to the control terminal of the gate circuit 754 is a binary image signal 864 which is read from the line buffer 717 in accordance with the address signal (X, Y). Accordingly, if the binary image signal 864 is at a logical level "1" (corresponding to a black pixel), the gate circuit 754 provides the distance signal 863 at its output. If the binary image signal 864 is at a logical level "0", the gate circuit 754 inhibits outputting of the distance signal 863. A minimum-distance detector 756 holds a past distance signal in a resistor 755 and also compares the distance signal 865 with a new distance signal 863 to hold the smaller one in the resistor 755. When all the process steps connected with the area shown in FIG. 23 have been completed in this manner, the minimum-distance detector 756 outputs a signal indicative of the shortest distance and a comparator 757 compares this shortest-distance signal with an optimum-distance signal 866 which is read from an optimum-distance table 758 in response to the original-image signal 800. If the former is smaller than the latter, the decision signal 809 is set to a logical level "1" and the corrector 713 performs correction of the input binary image signal 804.

The above fifth and sixth embodiments have been explained with illustrative reference to the example in which an optimum distance which is set in accordance with the input image density is compared with the shortest distance which is detected from processed neighboring pixels, but the above method is only illustrative. As another example, an area may be set in accordance with the input image density to determine whether or not a black pixel is contained in the area.

Explanation of Seventh Embodiment

When an error which is produced when a binary image signal corresponding to an objective pixel is to be diffused in an area corresponding to the positions of neighboring pixels, in what ratio the error should be distributed to the respective neighboring pixels is calculated by means of the weighting circuits 25a to 25d shown in FIG. 6, the weight computing device 719 of FIG. 18, or the like.

Normally, processes such as error calculations are integral calculations (with the figures below a decimal point omitted). Strictly speaking, the density of the input image is therefore not perfectly preserved in an output image. This fact may constitute a main cause of the phenomenon in which no dot is plotted in a low-density portion.

In the following description of the seventh embodiment, an example of ensuring preservation of density is explained.

Figure 25:
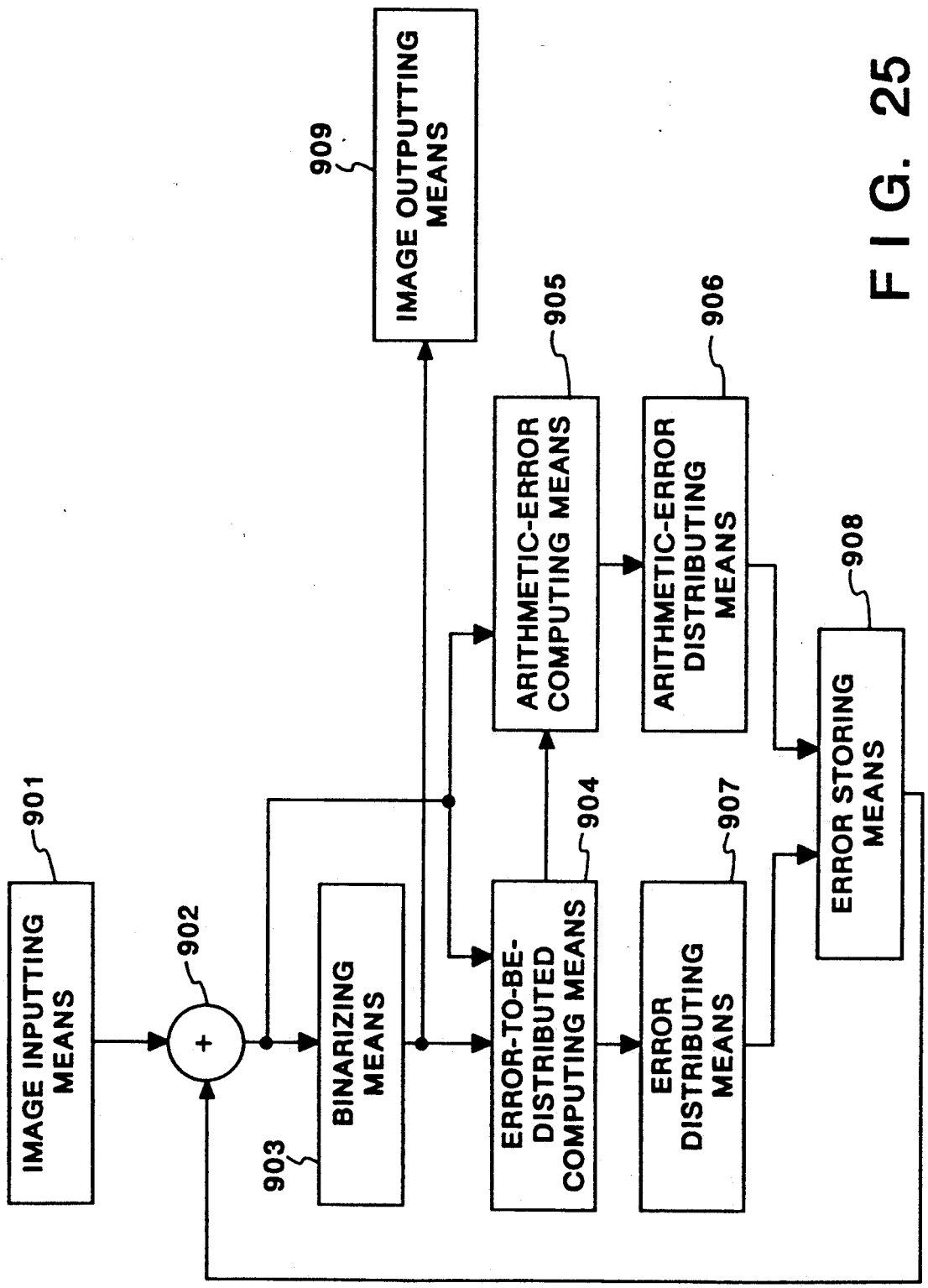
FIG. 25 is a concept diagram showing the construction of a seventh embodiment.

FIG. 25 is a concept diagram showing the construction of an image processing apparatus to which the seventh embodiment is applied.

The illustrated image processing apparatus includes the following elements: image inputting means 901; data adding means 902 for adding an input image signal to an error distributed from neighboring pixels; binarizing means 903 for binarizing a signal output from the data adding means 902; error-to-be-distributed computing means 904 for performing integral operations (with a decimal portion omitted) to obtain an error to be distributed to neighboring pixels from signals output from the binarizing means 903 and the data adding means 902; arithmetic-error computing means 905 for computing an arithmetic error from a signal from the data adding means 902 and a signal output from the error-to-be-distributed computing means 904; arithmetic-error distributing means 906 for determining to which pixel the signal output from the arithmetic-error computing means 905 should be distributed; error distributing means 907 for determining to which pixel the error data output from the error-to-be-distributed computing means 904 should be added; error storing means 908 for storing the data output from the arithmetic-error distributing means 906 and the error distributing means 907; and image outputting means 909 for outputting binarized data.

Figure 26:
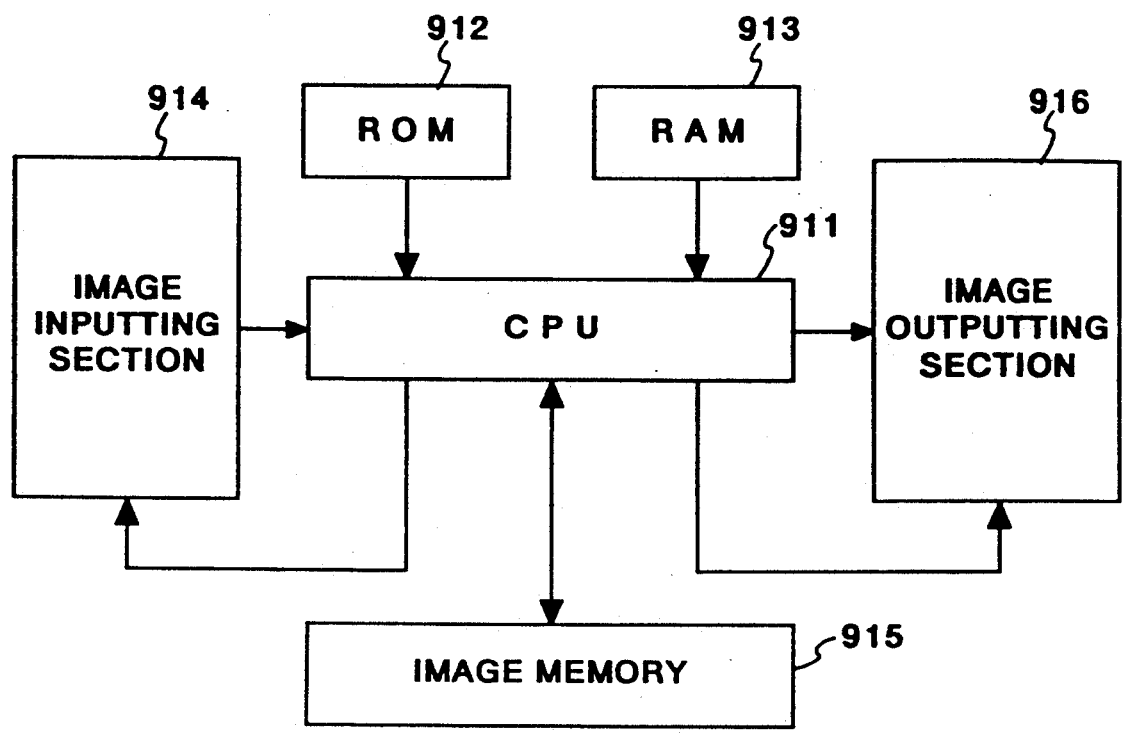
FIG. 26 is a block diagram showing an image processing apparatus to which the seventh embodiment is applied.

FIG. 26 shows a specific arrangement consisting of the above-described general construction.

In the figure, a CPU 911 provides control over the entire apparatus. A ROM 912 stores a procedure (program) for the CPU 911, and a RAM 913 is a RAM which is used as a work area for the CPU 911. The ROM 912 stores a program according to the flow chart shown in FIG. 28 which will be explained below. An image inputting section (for example, a scanner), denoted by 914, is arranged to input image information consisting of 8 bits per pixel (tone representation in 256 steps) in this embodiment. An image memory 915 stores error-diffusion data, and an image outputting section (for example, a printer) 915 forms a binary image.

Referring to the relationship between this image processing apparatus and the concept diagram of FIG. 1, the image inputting section 914 corresponds to the image inputting means 901. Moreover, the data adding means 902 to the error storing means 908 correspond to the CPU 911 to the RAM 913 and the image memory 915, and the image outputting means 909 corresponds to the image output section 916.

The above-described means 901 to 909 shown in FIG. 25 and the constituent elements 911 to 916 of the apparatus shown in FIG. 26 are explained below with reference to FIG. 27.

Figure 27:
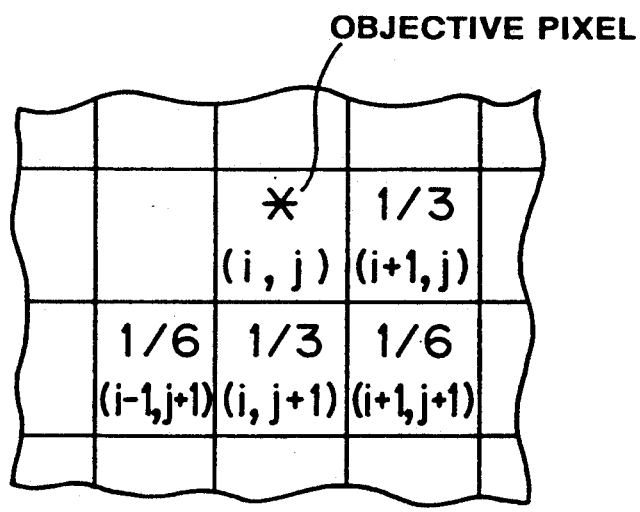
FIG. 27 is a view which serves to illustrate an error diffusion method in the seventh embodiment.

In FIG. 27, a "*" mark indicates the position of an objective pixel.

Now, when the objective pixel is input (the image inputting means 901 and the image inputting section 914), the density of the objective pixel is added to the error data (stored in the image memory 915) which was previously accumulated in (distributed to) the objective pixel position (data adding means). Then, on the basis of a predetermined threshold T, the density of the objective pixel density which is the result ($I_D$) of this addition is binarized into "0" or "255", that is to say, whether the pixel is represented in white or black is determined (binarizing means). Incidentally, the thus-binarized data is denoted by $O_D$.

Subsequently, in order to compute a distribution-error value which has occurred in the binarizing means, the added valued $I_D$ of the objective pixel is subtracted from the binarized data $O_D$ (error-to-be-distributed computing means):

$$\text{value to be distributed} = I_D - O_D$$

Then, in order to distribute this calculated value (with a sign) to pixels which neighbor on the objective pixel, as shown in FIG. 27, $[(I_D-O_D)/3]$ is distributed to each pixel position (i+1, j) and (i, j+1), while $[(I_D-O_D)/6]$ is distributed to each pixel position (i-1, j+1) and (i+1, j+1).

Incidentally, [. . . ] represents the Gaussian integer function and indicates the maximum integer which is below the number in the parentheses. Accordingly, high-speed arithmetic operation can be realized.

In this manner, when each value to be distributed is calculated, the calculated integral portion is distributed to each of the positions of corresponding four neighboring pixels in the image memory 15 (error distributing means).

However, even if these computations on error distribution are performed, the error amount prior to the distribution is not necessarily preserved perfectly. This is because, as explained below, in these computations on the value to be distributed, the portion which is below a decimal point is omitted.

For this reason, in this embodiment, the total sum $F_D$ of the omitted decimal portion is calculated and is redistributed in a distribution process.

$$F_D = (I_D - O_D) - 2\{[(I_D - O_D)/3] + [(I_D - O_D)/6]\}$$

The thus-obtained total sum $F_D$ of the omitted decimal portion (calculated by the arithmetic-error computing means is then subjected to redistribution.

However, in the process of distributing the total sum $F_D$ of the omitted error, the total sum $F_D$ is not evenly added to a pixel, for example, (i+1, j), which neighbors on the objective pixel (i, j). Instead, the total sum $F_D$ is distributed to neighboring pixels which are located irregularly with respect to the objective pixel.

A specific example is as follows.

$$N = MOD(j+i-2, 4) + 1$$

where MOD (M, K) represents the remainder which is obtained when the number M is divided by K.

Accordingly, the numerical value assumed by the variable N is "1" to "4".

In this embodiment, the position of a pixel to which $F_D$ is to be distributed is determined in accordance with the value of this variable N in the following manner (arithmetic-error distributing means).

More specifically, if the objective pixel position is (i, j), (1) for N=1, $F_D$ is added to the pixel position (i+1, j) in the image memory 915, (2) for N=2, $F_D$ is added to the pixel position (i-1, j+1), (3) for N=3, $F_D$ is added to the pixel position (i, j+1), and (4) for N=4, $F_D$ is added to the pixel position (i+1, j+1).

By redistributing data, which has heretofore been omitted, in the manner described above, it is possible to prevent the phenomenon in which no dot appears in a low-density (or high-density) portion (dots collapse to form a solid black area).

In addition, since $F_D$ is not always distributed to relatively the same position with respect to the objective pixel position but is always distributed to a different position, it is possible to prevent the phenomenon, peculiar to the error diffusion method, in which dots are formed in a fringe like manner. Incidentally, in order to prevent formation of the fringe pattern, the distribution cycle of $F_D$ has only to be disordered. Accordingly, a random variable R may be inserted in an arithmetic equation for calculating "N"

$$N = [4 \times R] + 1$$

When the error diffusion process of this embodiment has been performed on a single objective pixel in the image memory 915 (error storing means 908), the data on the objective pixel position is output to the image outputting section 916. Subsequently, the objective pixel position is updated and a similar process is repetitively performed on all the pixels for one page.

Incidentally, the density of the objective pixel is "0" or "255", but, when the data is to be output to the image outputting section 916 for producing a printout of the same, data of "0" is output as "0", while data "255" is output as "1".

Figure 28:
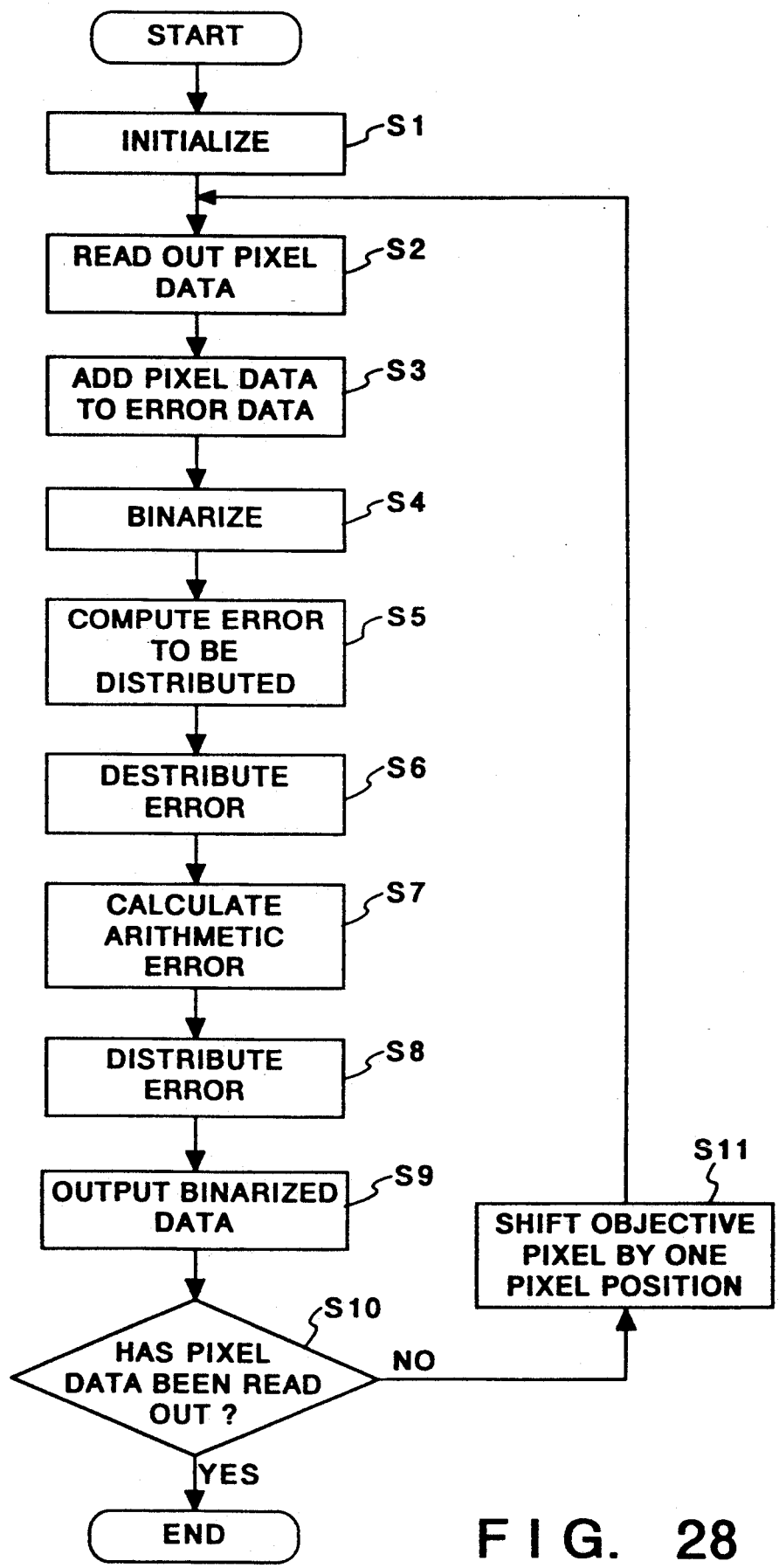
FIG. 28 is a flow chart showing the sequence of process steps and operations in the seventh embodiment.

FIG. 28 is a flow chart showing the procedure of the CPU 911 in a summarized form based on the above-described process outline.

First of all, in Step S1, initialization such as the clearing of the image memory 915 is performed and, in the next Step S2, pixel data is read from the image inputting section 914. The thus-read pixel data is hereinafter referred to as "objective pixel data". In Step S3, data stored in the objective pixel position in the image memory 915 ("0" in the initial state) is added to the read objective pixel data, and the result of this addition is binarized in Step S4. In Step S5, a distribution error (integral portion) which occurred when the binarization was effected is computed, and in Step S6 the error is distributed to predetermined pixels. Thereafter, in Step S7, an arithmetic error which is the total sum of an omitted decimal portion is calculated, and in Step S8 the calculated arithmetic error is distributed to pixels which neighbor on the objective pixel (the relative position of a neighboring pixel with respect to the objective pixel varies). In Step S9, the previously binarized objective pixel data is output to the image outputting section 916. Thereafter, whether or not reading of original image data has been completed, that is, whether or not the above-described process has been completed with respect to the pixels for one page is determined. If it is determined that the process has not yet been completed, the objective pixel position is updated in Step S11, and the process returns to Step S2.

As described above, in accordance with the seventh embodiment, it is possible to prevent the phenomenon in which no dot appears in a low-density portion and the phenomenon in which dots in a high-density portion collapse to form a solid black area, whereby excellent tone representation is enabled.

In addition to the above-described advantage, since pixel positions to which an arithmetic error is to be distributed are successively shifted instead of being uniformly specified, it is possible to prevent the phenomenon in which dots are chained to form a fringe pattern.

Further, each of the above embodiment is explained with reference to the example in which a single-color image is reproduced. However, if the above process is performed for each color component R, G and B (or Y, M and C), the present method can be applied to a color image reproduction. Accordingly, the present method is not limited to signal-color-image reproduction.

Further, although the range of error diffusion is limited to four of pixels which neighbor an objective pixel, for example twelve pixels may be selected, and the number of neighboring pixels is therefore not limited to these numbers.

In each of the embodiments, although error diffusion is carried out with the processing executed in CPU, the error diffusion may be achieved with a logic circuit. If the weighting factor for error diffusion is selected as $\frac{1}{2}^m$ instead of $\frac{1}{8}$ or 1/6, the required circuit can be achieved by a shift circuit alone, whereby it is possible to increase the processing speed to a great extent.

Although each of the first to seventh embodiments is explained with reference to a copying machine, the scope of the present invention is not limited to the copying machine alone. In other words, the scope of the present invention is not defined by the kind of image inputting means or image outputting means.

What is claimed is:

1. An image processing apparatus comprising:
   inputting means for inputting pixel data;
   variable-threshold generating means for generating a threshold corresponding to the pixel data input by said inputting means;
   fixed-threshold generating means for generating a fixed threshold;
   decision means for making a decision as to whether or not an input object pixel is located in the vicinity of an edge portion of an image;
   selecting means for selection a threshold generated by said variable-threshold generating means or a threshold generated by said fixed-threshold generating means on the basis of the result of the decision made by said decision means; and
   quantizing means for quantizing the input object pixel on the basis of a threshold selected by said selecting means.

2. An image processing apparatus according to claim 1, wherein said inputting means further comprises means for reading an original image in units of pixels and generating digital pixel data, corresponding to the individual pixels, as the pixel data input by said inputting means.

3. An image processing apparatus according to claim 2, wherein the pixel data is density data obtained when the original image is read.

4. An image processing apparatus according to claim 1, wherein the threshold generated by said variable-threshold generating means exhibits a variation for each input pixel, and wherein, as the value of the pixel data input by said inputting means becomes smaller, the range of the variation becomes larger.

5. An image processing apparatus according to claim 1, wherein the threshold generated by said variable-threshold generating means varies about the fixed threshold generated by said fixed-threshold generating means.

6. An image processing apparatus according to claim 1, wherein said fixed-threshold generating means generates a threshold which takes on an approximately middle value within the range of values which can be input by say inputting means.

7. An image processing apparatus according to claim 1, further comprising:
   memory means for storing a predetermined number of lines of quantized pixel data quantized by said quantizing means and relative to pixels located in the vicinity of the position of the object pixel;
   decision means for making a decision as to whether or not an output pixel dot is present in the quantized pixel data belonging to a predetermined area in the vicinity of the position of the object pixel and stored in said memory means; and
   setting means for forcibly setting the quantized pixel data processed by said quantizing means to a state wherein no output dot is present, on the basis of the value of the pixel data input by said inputting means and the result of the decision made by said decision means.

8. An image processing apparatus according to claim 1, wherein said quantizing means comprises means for generating binarized pixel data based on an error diffusion method.

9. An image processing apparatus according to claim 8, wherein, when an error occurring when the data of the object pixel is quantized into binary output data is negative and if said decision means determined that the object pixel is located in the vicinity of an edge portion of an image, the error which has occurred is not diffused into an area corresponding to the positions of non-quantized neighboring pixels.

10. An image processing apparatus according to claim 8, wherein, when an error occurring when the data of the object pixel data is quantized into binary output data is negative and if said decision means determines that the object pixel is located in the vicinity of an edge portion of an image, the error which has occurred is not diffused into an area corresponding to the positions of non-binarized pixels which are located on the side of the object pixel which is nearer to the edge portion.

11. An image processing apparatus for generating output pixel data by quantizing input pixel data, comprising:
   inputting means for inputting pixel data;
   area-state determining means for making a decision as to the state of quantized output pixel data in an area near to an object pixel input by said inputting means;
   edge determining means for making a decision as to whether or not the object pixel input by said inputting means is located in the vicinity of an edge portion of an image;
   variable-threshold generating means for generating a threshold corresponding to the pixel data input by said inputting means;
   quantizing means for quantizing the pixel data input by said inputting means into output pixel data on the basis of the threshold generated by said variable-threshold generating means and the decision made by said area-state determining means; and
   distributing means for distributing an error amount which occurs when said quantizing means effects quantization to at least one non-quantized pixel.

12. An image processing apparatus according to claim 11, wherein pixel data input by said inputting means is density data obtained when an original image is read.

13. An image processing apparatus according to claim 11, wherein the threshold generated by said variable-threshold generating means exhibits a variation for each input pixel, and wherein, as the value of the input pixel data becomes smaller, the width of the variation becomes larger.

14. An image processing apparatus according to claim 11, wherein the threshold generated by said variable-threshold generating means varies about an approximately middle value within the range of values which can be input by said inputting means.

15. An image processing apparatus according to claim 11, wherein said quantizing means comprises binarizing means for converting object pixel data into binary output data, said are-state determining means making a decision as to whether or not an output dot is present in a predetermined area near to the object pixel.

16. An image processing apparatus according to claim 15, wherein, when an error occurring when the object pixel data is binarized is negative and if the object pixel is located in the vicinity of an edge portion of an image, said distributing means distributes substantially zero to the positions of non-binarized neighboring pixels.

17. An image processing apparatus according to claim 15, wherein, when an error occurring when the object pixel data is binarized is negative and if said decision means determines that the object pixel is located in the vicinity of an edge portion of an image, said distributing means distributes substantially zero to the positions of non-binarized pixels located on the side of the object pixel which is nearer to the edge portion.

18. An image processing apparatus according to claim 12, wherein, if the density of the object pixel is lower than a predetermined value and if said area-state determining means determines that no output dot is present in a predetermined area near to the object pixel, said quantizing means provides output pixel data corresponding to the position of the object pixel in the form of data including no output dot.

19. An image processing apparatus for generating output pixel data by quantizing input pixel data, comprising:
inputting means for inputting pixel data;
are-state determining means for making a decision as to the state of quantized output pixel data in an area near to an object pixel input by said inputting means;
edge determining means for making a decision as to whether or not the object pixel input by said inputting means is located in the vicinity of an edge portion of an image;
threshold generating means for generating a threshold;
quantizing means for quantizing the pixel data input by said inputting means into output pixel data on the basis of the threshold generated by said threshold generating means and the decision made by said area-state determining means; and
distributing means for distributing an error amount which occurs when said quantizing means effects quantiziation to at least one non-quantized pixel, wherein said distributing means controls the distribution of the error amount on the basis of the decision made by said edge determining means.

20. An image processing apparatus according to claim 19, wherein said quantizing means comprises binarizing means for converting object pixel data into binary output data, said area-state determining means making a decision as to whether or not an output dot is present in a predetermined area near to the object pixel.

21. An image processing apparatus according to claim 20 wherein, when an error occurring when the object pixel data is binarized is negative and if the object pixel is located in the vicinity of an edge portion of an image, said distributing means distributes substantially zero to the positions of non-binarized neighboring pixels.

22. An image processing apparatus according to claim 19, wherein said threshold generating means generates a variable threshold.

23. An image processing apparatus for generating output pixel data by quantizing input pixel data, comprising:
inputting means for inputting pixel data;
edge determining means for making a decision as to whether or not an object pixel input by said inputting means is located in the vicinity of an edge portion of an image;
variable-threshold generating means for generating a variable threshold;
quantizing means for quantizing the pixel data input by said inputting means into output pixel data on the basis of the threshold generated by said variable-threshold generating means; and
distributing means for distributing an error amount which occurs when said quantizing means effects quantization of the object pixel to at least one non-quantized neighboring pixel, wherein said distributing means controls the distribution of the error amount on the basis of the decision made by said edge determining means.

24. An image processing apparatus according to claim 23, wherein said quantizing means comprises binarizing means for converting object pixel data into binary output data, said area-state determining means making a decision as to whether or not an output dot is present in a predetermined area near to the object pixel.

25. An image processing apparatus according to claim 24, wherein, when an error occurring when data of the object pixel is binarized is negative and if the object pixel is located in the vicinity of an edge portion of an image, said distributing means distributes substantially zero to the positions of non-binarized neighboring pixels.

* * * * *

UNITED STATES PATENT AND TRADEMARK OFFICE
CERTIFICATE OF CORRECTION

PATENT NO. : 5,086,484
DATED : February 4, 1992
INVENTOR(S) : AKIHIRO KATAYAMA, ET AL.    Page 1 of 4

It is certified that error appears in the above-identified patent and that said Letters Patent is hereby corrected as shown below:

SHEET 20 OF 24

FIG. 22, "REGISTOR" should read --REGISTER--;
"LINE BUFER" should read --LINE BUFFER--;
"864" from 754 should read --863--.

COLUMN 2

Line 26, "neighbors" should read --neighboring-- and
"." should read --is taken into account.--.

COLUMN 7

Line 26, "(i + 1, j - 1)" should read --(i - 1, j - 1)--.
Line 50, "FF 15)" should read --FF 15d)--.
Line 68, "of" (second occurrence) should be deleted.

COLUMN 8

Line 37, "signal" should read --sign--.
Line 39, "signal" should read --sign--.
Line 52, "gate 245" should read --gate 24--.
Line 54, "gate 245" should read --gate 24--.

COLUMN 10

Line 13, "data" should read --data on--.

COLUMN 12

Line 17, "signal" (second occurrence) should be deleted.

UNITED STATES PATENT AND TRADEMARK OFFICE
CERTIFICATE OF CORRECTION

PATENT NO. : 5,086,484
DATED : February 4, 1992
INVENTOR(S) : AKIHIRO KATAYAMA, ET AL.

It is certified that error appears in the above-identified patent and that said Letters Patent is hereby corrected as shown below:

COLUMN 13

Line 13, "An as" should read --As an--.
    Line 18, "twenty four" should read --twenty-four--.

COLUMN 14

Line 21, "o 20" should be deleted.
    Line 22, "L" should be deleted.

COLUMN 15

Line 26, "describe" should read --described--.

COLUMN 17

Line 21, "pixel "*"," should read --pixel "*";--.
    Line 24, "needs" should read --need--.
    Line 60, "calculator 34" should read --calculator 734--.

COLUMN 18

Line 43, "signal 209," should read --signal 839,--.
    Line 52, "unchanged." should read --to remain unchanged.--.
    Line 65, "773," should read --772, 773,--.

COLUMN 19

Line 29, "resistor" should read --register--.
    Line 31, "resistor" should read --register--.

UNITED STATES PATENT AND TRADEMARK OFFICE
CERTIFICATE OF CORRECTION

PATENT NO. : 5,086,484
DATED : February 4, 1992
INVENTOR(S) : AKIHIRO KATAYAMA, ET AL.      Page 3 of 4

It is certified that error appears in the above-identified patent and that said Letters Patent is hereby corrected as shown below:

COLUMN 20

Line 44, "printer) 915" should read --printer) 916--.
Line 49, "correspond" should read --corresponds--.

COLUMN 21

Line 24, "memory 15" should read --memory 915--.
Line 36, "$F_D=(I_D-O_D)-2\{](I_D-O_D)/3]+[(I_D-O_D)/6]\}$" should read
--$F_D=(I_D-O_D)-2\{[(I_D-O_D)/3]+[(I_D-O_D)/6]\}$--.
Line 40, "means" should read --means 5)--.

COLUMN 22

Line 12, "fringe like" should read --fringe-like--.

COLUMN 23

Line 5, "embodiment" should read --embodiments--.
Line 13, "of" should be deleted.

UNITED STATES PATENT AND TRADEMARK OFFICE
CERTIFICATE OF CORRECTION

PATENT NO. : 5,086,484
DATED : February 4, 1992
INVENTOR(S) : AKIHIRO KATAYAMA, ET AL.

It is certified that error appears in the above-identified patent and that said Letters Patent is hereby corrected as shown below:

COLUMN 25

Line 19, "are-state" should read --area-state--.
Line 49, "are-state" should read --area-state--.

Signed and Sealed this

Twenty-ninth Day of June, 1993

Attest:

MICHAEL K. KIRK

Attesting Officer    Acting Commissioner of Patents and Trademarks